US012624576B2

(12) United States Patent
Condorodis

(10) Patent No.: US 12,624,576 B2
(45) **Date of Patent: *May 12, 2026**

(54) DOOR AND WINDOW SECURING APPARATUS AND METHOD

(71) Applicant: George Condorodis, Winter Garden, FL (US)

(72) Inventor: George Condorodis, Winter Garden, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,064

(22) Filed: Feb. 12, 2024

(65) Prior Publication Data

US 2024/0183200 A1 Jun. 6, 2024

Related U.S. Application Data

(63) Continuation of application No. 17/947,597, filed on Sep. 19, 2022, now Pat. No. 11,898,376, which is a (Continued)

(51) Int. Cl.
*E05B 65/08* (2006.01)
*E05B 15/02* (2006.01)
(Continued)

(52) U.S. Cl.
CPC ............ *E05B 65/087* (2013.01); *E05B 15/02* (2013.01); *E05B 17/226* (2013.01); *E05B 53/00* (2013.01);
(Continued)

(58) Field of Classification Search
CPC ........ E05B 15/02; E05B 17/22; E05B 17/226; E05B 2047/0094; E05B 2047/0095;
(Continued)

(56) References Cited

U.S. PATENT DOCUMENTS 410,934 A * 9/1889 Sanders et al. ..... E05B 65/0864 292/175
788,702 A * 5/1905 Briggs ................ E05B 65/0864 70/90
(Continued)

FOREIGN PATENT DOCUMENTS

DE 202009010418 U1 1/2011
JP 36570352 B2 6/2005

OTHER PUBLICATIONS

PCT ISA/US (USPTO); PCT/US2022/044462 International Search Report; Oct. 20, 2022; All pages.
(Continued)

*Primary Examiner* — Christopher J Boswell
(74) *Attorney, Agent, or Firm* — Lowndes; Stephen C. Thomas; Robert Fredeking

(57) ABSTRACT

A locking apparatus and method for securing a door or window comprising a substantial controllable mechanical locking mechanism that secures the sliding door or window into the receiving channel such that the locking mechanism cannot be disengaged from the receiving structure by a manual force; prevents the door or window from being lifted out of a bottom track by mere manual force; is able to report the door or window status as closed or open and as locked or unlocked to a remote user; is able to be remotely locked and unlocked using an application running on a mobile device or computer, or, alternatively by accessing a web accessible portal from a mobile device, electronic device or computer; and is manually operable by a user in the event of a power outage. A manually operated embodiment is useful for use cases in which no electric power is available.

17 Claims, 26 Drawing Sheets

Related U.S. Application Data continuation of application No. 17/517,098, filed on Nov. 2, 2021, now Pat. No. 11,447,983.

(60) Provisional application No. 63/247,352, filed on Sep. 23, 2021.

(51) Int. Cl.
*E05B 17/22* (2006.01)
*E05B 53/00* (2006.01)
*E05B 47/00* (2006.01)

(52) U.S. Cl.
CPC .......... *E05B 65/08* (2013.01); *E05B 65/0876* (2013.01); *E05B 2047/0094* (2013.01); *E05B 2047/0095* (2013.01)

(58) Field of Classification Search
CPC ...... E05B 53/00; E05B 65/08; E05B 65/0864; E05B 65/087; E05B 65/0876; E05B 65/0882
See application file for complete search history.

(56) References Cited

U.S. PATENT DOCUMENTS

| | | | | |
|---|---|---|---|---|
| 1,711,972 | A | 5/1929 | Seiler | |
| 2,098,249 | A | 11/1937 | Kistner | |
| 3,390,557 | A | 7/1968 | Erickson et al. | |
| 3,907,343 | A | 9/1975 | Goodwin | |
| 4,073,518 | A | 2/1978 | Goodwin | |
| 4,699,406 | A | 10/1987 | Swanson, Jr. | |
| 4,759,575 | A | 7/1988 | McKnight | |
| 4,802,353 | A | 2/1989 | Corder et al. | |
| 4,850,623 | A * | 7/1989 | Franklin | E05B 47/0002 292/144 |
| 5,216,909 | A | 6/1993 | Armoogam | |
| 5,362,116 | A | 11/1994 | Doyle et al. | |
| 5,715,631 | A | 2/1998 | Kailian et al. | |
| 5,852,944 | A | 12/1998 | Collard, Jr. et al. | |
| 6,516,575 | B2 | 2/2003 | Haab et al. | |
| 6,736,433 | B2 | 5/2004 | Schwesig | |
| 7,100,405 | B2 | 9/2006 | West | |
| 7,425,026 | B1 | 9/2008 | Henderson et al. | |
| 8,376,421 | B2 | 2/2013 | Simmonds | |
| 8,528,272 | B1 | 9/2013 | Foss | |
| 9,512,643 | B1 | 12/2016 | Keefe | |
| 9,810,000 | B2 | 11/2017 | Schroeder | |
| 10,176,652 | B2 | 1/2019 | Romero et al. | |
| 10,487,543 | B2 | 11/2019 | Sanford et al. | |
| 10,548,084 | B1 | 1/2020 | Venkateswaran et al. | |
| 10,655,372 | B2 | 5/2020 | Meredith | |
| 10,829,956 | B2 | 11/2020 | Harris | |
| 11,066,850 | B2 | 7/2021 | Welbig et al. | |
| 11,447,983 | B1 * | 9/2022 | Condorodis | E05B 47/026 |
| 11,898,376 | B2 * | 2/2024 | Condorodis | E05B 65/0876 |
| 2004/0089038 | A1 | 5/2004 | Iijima | |
| 2005/0210938 | A1 | 9/2005 | Doyle et al. | |
| 2006/0000147 | A1 | 1/2006 | Pieper | |
| 2017/0193724 | A1 | 7/2017 | Johnson et al. | |
| 2018/0051478 | A1 | 2/2018 | Tagtow et al. | |
| 2019/0024412 | A1 | 1/2019 | Lammers et al. | |
| 2019/0026968 | A1 | 1/2019 | Tartal et al. | |
| 2019/0032368 | A1 * | 1/2019 | Welbig | E05B 65/08 |
| 2019/0096202 | A1 | 3/2019 | Seelman | |
| 2019/0182669 | A1 | 6/2019 | Conrad et al. | |
| 2019/0330885 | A1 | 10/2019 | Telljohann et al. | |
| 2019/0352930 | A1 | 11/2019 | Beck | |
| 2019/0371101 | A1 | 12/2019 | Friedli | |

OTHER PUBLICATIONS

PCT ISA/US (USPTO); PCT/US2022/044462 Written Opinion of the International Searching Authority; Oct. 20, 2022; All pages.
August Smart Lock, 2nd Generation, HomeKit, downloaded Apr. 1, 2020, www. smartlocksguide.com.
Smart Locks Scout, 2019 Buyers Guide, http://www.postscapes.com/smart-locks/); 2019.
Command Lock Smart Electric Sliding Door Lock Kit by Lingle Technologies; Sep. 28, 2020; www.lingletech.com.

* cited by examiner

UNLOCKED POSITION

OVERRIDE POSITION

LOCKED POSITION

UNLOCKED POSITION

OVERIDE POSITION

UNLOCKED POSITION

UNLOCKED POSITION EXPLODED VIEW

UNLOCKED POSITION CUTAWAY VIEW

LOCKED POSITION EXPLODED VIEW

LOCKED POSITION CUTAWAY VIEW

OVERRIDE POSITION

OVERRIDE POSITION EXPLODED VIEW

OVERRIDE POSITION CUTAWAY VIEW

DOOR AND WINDOW SECURING APPARATUS AND METHOD

CROSS REFERENCE TO RELATED APPLICATIONS AND INCORPORATION BY REFERENCE

This non-provisional patent application is a continuation of, and claims benefit of priority to, U.S. Non-Provisional patent application Ser. No. 17/947,597 entitled DOOR AND WINDOW SECURING APPARATUS AND METHOD, filed in the United States Patent and Trademark Office (USPTO) on Sep. 19, 2022, the disclosure of which is herein incorporated by reference in its entirety; Ser. No. 17/947,597 is a continuation of, and claims benefit of priority to, U.S. Non-Provisional patent application Ser. No. 17/517,098 entitled DOOR AND WINDOW SECURING APPARATUS AND METHOD, filed in the United States Patent and Trademark Office (USPTO) on Nov. 2, 2021, the disclosure of which is herein incorporated by reference in its entirety; Ser. No. 17/517,098 is a non-provisional of, and claims benefit of priority to, U.S. Provisional Patent Application No. 63/247,352 entitled DOOR AND WINDOW SECURING APPARATUS AND METHOD, filed in the United States Patent and Trademark Office (USPTO) on Sep. 23, 2021, the disclosure of which is herein incorporated herein by reference in its entirety.

STATEMENT REGARDING FEDERALLY SPONSORED RESEARCH OR DEVELOPMENT

Not applicable.

FIELD OF THE INVENTION

The field of the invention relates generally to an apparatus and method for securing doors or windows in structures, such as buildings which may include, for example, commercial structures, residential structures or any other type structure having a door, window or other opening having a closable structure. More specifically, the field of the invention relates generally to a locking apparatus and method for securing sliding glass doors in commercial or residential building structures. Still further, the field of the invention relates generally to locking systems, apparatuses, and methods for doors and windows that are remotely controllable to lock or unlock a door or window, and to report the open or closed status of the door or window; and, if the door or window is closed, to report the locked or unlocked state of the door or window.

BACKGROUND

Historically, doors and windows have represented a weak point for building structures security, as representing opportunities for unauthorized access to the interior of a structure such as a home or other building. More specifically, sliding glass doors and windows that operate on a sliding track have represented significant security risks. As used herein, "security risk", includes within its meaning the risk that an opening in a structure such as a home or other building may be traversed by an unauthorized person even though the structure opening is secured by a door or window that is supposedly closed and locked, such that the unwanted person is able to gain unauthorized access to the interior of a building structure through a door ow window despite the door or window being closed and locked, or at least thought to be closed and locked.

One such exemplary case of a historically insecure closure is the typical sliding glass door closures of the prior art. Such sliding glass doors typically slide along a U-shaped track, the door window being held in a bottom U-shaped (or other shaped) track by gravity, and secured against a receiving channel, or structure, by a simple sheet-metal tang or hook that engages a hole or other opening in, or attached to, the receiving channel when the door is in a closed position. The sheet-metal tang or hook of the prior art is typically fabricated from thin sheet metal material which, in exemplary cases, may only be 0.060-0.090 inches in thickness. Such thin sheet metal tangs are easily bent by application of force such that the doors they secure may be forcibly removed from the opening in the receiving frame by simply applying manual force to the door, pulling the door backward and away from the receiving frame. Thus, all a would-be unauthorized intruder has to do in order to open a locked sliding glass door of the prior art is to simply grasp the door handle and manually pull, or yank, the door away from the receiving door frame. This ability to forcibly open a locked door, often without the need for any tools whatsoever, renders the sliding glass doors of the prior art a security risk, and renders the door and window locking apparatuses of the prior art unsuitable for their intended use.

A still further aspect of traditional sliding glass door and window design leading to a security weak point is the fact that most sliding glass doors or windows are able to be lifted against the force of gravity such they may be lifted up and removed from the bottom sliding door track in which the door is slidably engaged. In an exemplary case, an application of upward manual force may be enough to simply lift the sliding glass door up and out of the bottom track in which it resides and is slidably engaged, allowing the door or window to be removed entirely. Again, if such a door or window is locked (or secured) using the above mentioned traditional sheet-metal tang that is captured in the receiving channel, a simple application of manual force is generally enough to bend or deform the sheet-metal tang such that the sheet-metal tang may be removed from the opening in the receiving channel, thus allowing the door or window to be removed by sheer application of force. Again, this would allow unauthorized entry into the building or other structure that was intended to be secured by the locking apparatus of the prior art. Again, the door and window locking apparatuses of the prior art are seen to be, in many cases, unsuitable for their intended use.

In other words, at least two historical modes of failure of the door locking and securing systems of the past, especially with regard to sliding doors and windows, are that 1) the thin sheet metal tangs of the door locks of the prior art may be defeated by an application of force, which in some cases may simply be the application of manual force pulling or yanking on the door handle with sufficient force to deform the thin sheet metal locking tang; and 2) sliding doors and windows of the prior art, even if locked and closed, may in many cases simply be lifted up and out of the bottom tracks with which they translate, allowing the door or window to be pried open or removed entirely from the door or window frame. In both cases, the doors and windows of the prior art may be traversed by an unauthorized person, allowing unwanted and unauthorized entry to a building structure, despite the door or window being closed and locked.

These weaknesses and shortcomings in door and window closings of the prior art have long been known. There has been a long felt need in the art for an apparatus and method for securing doors and windows, especially those doors and windows that operate on a sliding track, in a more secure manner than has been heretofore available. There has also been a long felt need in the art for an apparatus and method for reporting the open or closed and locked or unlocked status of doors and windows, including but not limited to sliding glass doors, that is more secure than systems and methods of the prior art.

Certain approaches and techniques for securing sliding doors and windows have been suggested in the past, but these have not been effective. One example of such historical technique for securing the sliding glass door opened up is to place an elongated structure such as a broom handle stick, or other elongate structure, in the running channel of the bottom track of a sliding door or window, such that the sliding door or window is unable to be motivated in a backwards direction, i.e., away from the receiving channel, after it has been closed. This approach has several disadvantages. Firstly, it does not prevent the door from being lifted up and out of the bottom channel and displaced or removed entirely as described above. Secondly, it is only possible to secure the door from inside the structure because the elongate structure must be placed inside the bottom track from inside the structure after the door or window is closed. Further, it is not possible for an authorized user to open the door or window from the outdoor side of the building, because the elongate structure is not accessible from outside the building. Thirdly, the elongate structure is subject to being misplaced or lost and thus rendered completely ineffective.

Other approaches for securing sliding doors and windows have been suggested, for example, using security cameras and adding an alarm to indicate that the door has been opened in an unauthorized manner. However, these approaches do not actually prevent unauthorized entry into a building or structure; they simply report or record the unauthorized entry. They simply indicate when an intrusion has taken place. Therefore, they do not operate to increase the security of a structure opening that is secured by a sliding door, such as a sliding glass door, or by a sliding window.

What is needed in the art, therefore, is an apparatus and/or method adapted to secure a door or window that is intended to enclose an opening in a structure, such as a residential or commercial building, that, in embodiments, may comprise all or any portion or combination of the following features and benefits:

- Replaces a door or window locking apparatus of the prior art without the need to modify the door or window; in other words, the locking apparatus of the prior art is removed from the door or window, and the novel locking apparatus of the invention fits into the existing opening, or void, in the door that is vacated by the removal of the prior art locking apparatus, and, in embodiments, utilizes the same holes, which may be threaded holes, to attach the novel locking apparatus of the invention to the window or door frame without the need to physically modify the window or door frame (i.e., the locking apparatus of the invention may, in embodiments, be a "drop-in" replacement for prior locking apparatuses such as those that were originally provided with the door or window;
- Securely prevents the door or window from the being forced open by use of mere application of manual force;
- Securely prevents the door or window from being lifted out of its bottom track and either displaced from its frame, or removed altogether, allowing unauthorized entry to the interior of a building or other structure that has been secured by the door or window;
- Is, in embodiments, remotely lockable, unlockable, or both by a user using a computer or mobile electronic device such as a smart phone or tablet;
- Is, in embodiments, able to report an open, closed, locked or unlocked state of the door or window to a remote user using a computer or mobile electronic device;
- Is, in embodiments, able to be retrofitted onto existing sliding doors or windows;
- Is, in embodiments, manually operable to place a door or window into a locked state or an unlocked state in case of a power outage or loss of functionality of its electronic or electrical circuits or components, or in situations in which no electric power is available;
- In embodiments, provides an electrically conductive closure for pre-wired window and door receiving structures, or wall frames, wherein the locking apparatus comprises electrically conductive contacts that connect to the electrical contacts in a wall frame or receiving structures (such as, for example, low voltage wiring), providing a closed electrical circuit when the door or window is in a closed state; and
- In embodiments, is fully manually operable, requiring no electric power or electronic components in order to placed in to a locked or unlocked state.

SUMMARY OF THE INVENTION

The present invention, which overcomes the aforementioned shortcomings in the prior art and provides, in its various embodiments, the needed features listed above that are not found in the present art, comprises a locking apparatus and method that have one or more of the following features and/or steps, which alone or in any combination, and in any quantity, may comprise patentable subject matter.

In the various embodiments, the locking apparatus of the invention comprises a first portion 100 that is assembled into the frame of a door or window, and a second portion, comprising a pin locking tab 200, that is attached to a receiving structure, such as receiving channel attached to a wall against which the door or window closes, such as, for example wall 004 in FIG. 1B. The first portion 100 may further have an indoor portion and an outdoor portion. When the door or window is placed in a closed position, the door or window frame to which the locking apparatus first portion 100 is attached is motivated to come into proximity to the receiving structure. The locking tab, which is attached to the receiving structure, enters into and is received by the locking apparatus first portion. The locking apparatus first portion comprises a locking pin that is operable to be translated into, and received by, an opening in the locking tab after the locking tab has been received by the locking apparatus first portion when the door or window is placed into a closed state. The fit between the locking pin and the opening in the locking tab that receives the locking pin may be a sliding fit, or it may be a fit that allows for minor manufacturing and assembly tolerances such that the fit between the outer dimension of the locking pin and the inner dimension of the opening in the locking tab that receives the locking pin is a loose fit. For example, in embodiments, the inner dimension of the of the opening in the locking tab that receives the locking pin may be 0.060 or 0.090 inches greater than the outer dimension of the locking pin.

The present method and device of the invention overcome the shortcomings of the prior art by providing a mechanically substantial locking apparatus and method that secures a sliding door or window to a receiving structure, such as a receiving channel of a door frame, such that the locking apparatus, and thus the door or window, cannot be disengaged from the receiving structure by manual force; prevents unauthorized access to a building structure by physically preventing a door or window from being lifted out of a bottom track by mere manual force; is able to report a closed or open status and a locked or unlocked status to a remote user; is able to be remotely locked and unlocked by a remote user; and is operable by a user in the event of a power outage or in installations in which no electrical power is available, or in which electrical power is unreliable, such as in remote geographic locations. It is a feature and object of the invention that the invention provides a much higher degree of security over the sliding door and window locks of the prior art, in that its inventive locking pin mechanism comprises a robust structure for securing the door or window that is both novel and non-obvious, and is operable to withstand much greater applied forces than the securing devices of the prior art.

In embodiments, the locking apparatus comprises a locking pin having a distal end, the locking pin being attached to a sliding car that is slidably engaged with a base plate. The sliding car is operable to be translated along the sliding engagement with the base plate, and the base plate is fixed, either directly or indirectly, to the window or door frame. The locking tab is attached to a surface of the receiving structure and has an opening for receiving said distal end of said locking pin. The locking pin may be controllable to be translated towards the locking tab, or retracted away from the locking tab, by an actuator that is in electrical communication with a controller. The controller may be adapted (for example, may read and execute non-transitory computer readable and executable instructions stored in a physical computer-readable media) to command the actuator to extend the locking pin towards said locking tab, or to retract said locking pin away from said locking tab. In embodiments, the locking tab may have an axis that is coaxial with an axis of the opening in the locking tab when said door or window is in a closed position. The locking apparatus may have a locked state and an unlocked state. The locking apparatus locked state may be defined as a state in which the locking pin distal end has been extended toward said locking tab and has been received by the opening in the locking tab, preventing the door or window to be opened. The locking apparatus unlocked state may be defined as a position in which the locking pin has been retracted from the locking tab opening such that no portion of the locking pin distal end is present in the locking tab opening, and thus the door or window is able to be opened.

In embodiments, the sliding car and the base plate may be subject to an expanding, or biasing, force between them provided by, for example, a compressed or partially compressed compression spring, the expanding force tending to motivate the sliding car along its sliding engagement with the base plate, thus tending to translate the locking pin distal end towards the locking tab opening when the door or window are in a closed state; and wherein the actuator is controllable by the controller to retract the locking pin away from the locking tab, overcoming the expanding force.

In embodiments, the locking apparatus may further comprise a rotatable shaft having a knob that is operable to exert a resulting force on the sliding car when the knob is rotated, such that the sliding car is translated away from the locking tab against the expanding force, translating the locking pin away from the locking tab opening such that no portion of the locking pin distal end is present in the opening in the locking tab, thus placing the locking apparatus in an unlocked state. In this manner, a user may manually unlock the locking apparatus, which may be useful at any time, but especially during a power outage, as the ability to manually place the locking apparatus in an unlocked state will allow egress from the building other structure in the occurrence of a power outage. This feature also allows a user inside the building to, for example, temporarily unlock the door or window, allow entry of an authorized guest into the building, without the need to locate and operate a mobile or other electronic device to command the door into an unlocked state so that the guest may enter the building.

In embodiments, the locking apparatus first portion may be further defined as comprising an indoor portion and an outdoor portion. Each of the indoor portion and outdoor portion may have a cover. The covers may take any desired shape; the shapes shown in the figures are exemplary in nature.

In embodiments, for locking apparatus manual operation, a rotatable shaft may protrude through the indoor-side cover, and the knob may be attached to a portion of the rotatable shaft that extends through a cover of the indoor-portion.

In embodiments, the locking apparatus base plate, slide car, actuator, and locking pin comprise an assembly that comprise the locking apparatus first portion, that is adapted to be located within a void 500 located in a window or door frame, and wherein the locking tab protrudes through an opening in the base plate when the door or window is in a closed position. For aftermarket applications, such as retrofitting an existing door or window to receive the locking apparatus of the invention, the void may be cut into the existing door or window frame using known methods such as, but not limited to, using saws, routers, drills or other cutting devices to create the void for receiving the locking apparatus assembly. In other applications, the locking apparatus assembly may be installed at the window or door at the time of manufacturing. In such original equipment manufacturer (OEM) use cases, the void may be cut into the existing door or window frame using known methods such as, but not limited to, using saws, routers, drills or other cutting devices; or, alternatively, it may be cast or molded into the door or window frame.

In embodiments, the locking apparatus may further comprise a user input device accessible from an outdoor side of the window or door, the user input device in communication with the controller, and the user input device operable to receive at least one, or a plurality of, user input codes from a user, the codes used for commanding the controller to place the locking apparatus in a locked or an unlocked state. In this manner a user may place a door or window into a locked or unlocked state from the outdoor side of the building. The user input device may be located on the outdoor, or outside, cover.

In embodiments, the user input device may be a keypad, touchpad, discrete switches, or other user input device.

In embodiments, the locking apparatus may further comprise a switch that provides an electrical signal to the controller indicating whether the door or window is in a closed or open state.

In embodiments, the controller may be adapted to command the actuator to retract, or to remain retracted, if the door or window is in said open state.

In embodiments, the controller may be adapted to communicate wirelessly with at least one, or a plurality of, user electronic devices such as mobile devices or computers, for accepting commands from the at least one, or a plurality of, user mobile devices or computers, and for providing status information as to whether the door or window is open or closed, as to whether the locking apparatus is locked or unlocked, to the at least one, or a plurality of, user mobile devices or computers.

In embodiments, the at least one, or a plurality of, user mobile devices or computers may be adapted to receive user input commands for commanding the controller to control the extension of the locking pin, thus placing the locking apparatus in the locked state; or to receive user input commands for commanding the controller to command the retraction of the locking pin, and to transmit such commands to the controller, thus placing the locking apparatus in the unlocked state.

In embodiments, the at least one, or a plurality of, user mobile devices or computers may be adapted to receive status information of the locking apparatus as being either in a locked state or an unlocked state from the controller, and to display the status information of the locking apparatus on a display of the at least one, or a plurality of, user mobile devices or computers.

In embodiments, the at least one, or a plurality of, user mobile devices or computers may be adapted to receive status information of the door or window from the controller as being either in an open state or a closed state, and to display the status information of the door or window on a display of the at least one, or a plurality of, user mobile devices or computers.

In embodiments, the locking apparatus controller may be adapted to be in data communication with at least one, or a plurality of, servers, which may be remote services located in any geographic location, wherein the at least one, or a plurality of, servers comprise instructions for presenting a web-accessible portal, and wherein the web-accessible portal may be in communication with at least one, or a plurality of, user mobile devices or computers via a browser application operating on said at least one, or a plurality of, user mobile devices or computers, and wherein the web portal is adapted to receive user input commands for commanding the controller to control the extension of the locking pin, and to transmit such commands to the controller of the locking apparatus, thus placing the locking apparatus in the locked state, or commanding retraction of the locking pin, thus placing the locking apparatus in the unlocked state.

In embodiments, the locking apparatus of the invention may further comprise at least one, or a plurality of, servers in communication with the controller of the locking apparatus, wherein the at least one, or a plurality of, servers comprise instructions for presenting a web-accessible portal, and wherein said web-accessible portal may be in communication with at least one, or a plurality of, user mobile devices or computers via a browser application operating on said at least one, or a plurality of, user mobile devices or computers, and wherein said web portal is adapted to receive status information of the locking apparatus as being either in a locked state or an unlocked state from the controller, and to display the status information of the locking apparatus on a display of said at least one, or plurality of, user mobile devices or computers.

In embodiments, the locking apparatus controller may be adapted to be in data communication with at least one, or a plurality of, servers, wherein said one or a plurality of servers comprise instructions for presenting a web-accessible portal to a browser, and wherein said web-accessible portal may be in data communication with at least one, or a plurality of, user mobile devices or computers via a browser application operating on the at least one, or a plurality of, user mobile devices or computers, and wherein said web portal is adapted to receive status information of the door or window as being either in an open state or a closed state from the controller, and to display the status information of the door or window on a display of said at least one, or plurality of, user mobile devices or computers.

In embodiments, the locking apparatus may be entirely manual, meaning that the locking pin may be manually operated as opposed being operated by a controllable actuator. In such embodiments, the invention may allow a user to place the locking apparatus into a locked state or an unlocked state entirely by manual operation, i.e., without the use of any electrical power, such as, for example, by rotating a knob. These embodiments are useful, for example, in situations in which electrical power is not available.

In embodiments, the invention may comprise a manually-operated locking apparatus for securing a sliding door or window to a receiving structure, comprising: a locking pin having a distal end, the locking pin being attached to a slide car that is slidably engaged with a base plate. The slide car may be translatable along the sliding engagement with the base plate, and the base plate may be fixed relative to the door or window frame. The pin locking tab may have an pin receiving opening for receiving the distal end of the locking pin, and the pin locking tab may be attached to a surface of the receiving structure. The slide car and the base plate may be subject to an expanding, or biasing, force between them tending to motivate the sliding car along the sliding engagement, thus tending to translate the locking pin distal end towards the pin locking tab pin receiving opening. The expanding or biasing force may be provided by a compression spring. The locking apparatus may be manually operable to retract the locking pin away from the pin locking tab, overcoming the expanding force. The pin locking pin may be operable to be extended towards into a pin receiving opening in the pin locking tab, or retracted out the pin receiving opening and away from the pin locking tab, by manually operable features such as, for example, a rotatable knob that is in mechanical communication with the slide car either directly or indirectly through an intervening structure. In embodiments, the pin locking tab may have an axis that is coaxial with an axis of the pin receiving opening when the door window is in a closed state. The locking apparatus may have a locked state and an unlocked state, wherein said locking apparatus locked state is defined as a state in which said locking pin distal end has been translated, i.e. extended, toward said locking tab and has been received by said opening; and wherein the locking pin unlocked position is defined as a position in which said locking pin has been translated, i.e., retracted, from the pin locking tab pin receiving opening such that no portion of the locking pin distal end is present in said pin receiving opening. In certain embodiments of this embodiment of the invention, no electrical components or electrical power are required.

Still further, in embodiments, the apparatus of the invention may include an anti-lift door stop that operates to further keep a sliding glass door from being lifted from its track along the bottom of the door. The anti-lift door stop may comprise a structure attached to an upper, or top, portion of a sliding glass door frame such that the sliding glass door is allowed to freely translate along its bottom track, but prevents lifting of the door from its bottom track by providing a physical interference between a surface of the anti-lift door stop and a surface of the upper track, or between a surface of the anti-lift door stop and a surface of a structure attached to the upper track.

In embodiments, the locking apparatus may comprise a manual key lock for manually placing the locking apparatus in a locked or unlocked state, allowing a user to manually, using a mating key, lock or unlock the locking apparatus from outside the building or structure.

In embodiments, the locking apparatus of the invention may replace a door or window locking apparatus of the prior art (as depicted in exemplary fashion in FIG. 1A) without the need to modify the door or window frame (i.e., the locking apparatus of the invention may be a "drop-in" replacement locking apparatus, allowing a user to upgrade their legacy locking apparatus, with the locking apparatus of the invention in order to take advantage of the many inventive features and benefits of the locking apparatus of the invention). In such "drop-in" embodiments, the locking apparatus of the prior art is first removed from the door or window, and the novel locking apparatus of the invention is of proper dimension and shape such that it able to (i.e., is adapted to) fit into the existing opening, or void, 500 in the door or window frame that is vacated by the removal of the prior art locking apparatus; and, in embodiments, the locking apparatus of the invention utilizes the same holes as the prior art locking apparatus, which may, for example, be threaded holes, to attach the novel locking apparatus of the invention to the window or door frame without the need to physically modify the window or door frame, or drill new mounting holes (these holes, for example, may be any mounting holes, but in exemplary embodiments they may be holes such as holes 3000 that are depicted in FIG. 5B, for receiving and threadingly engaging fasteners that are inserted, for example, through holes in the locking apparatus such as holes 2002 and 2003 in base plate 107 as depicted in FIGS. 1A and 6B). In such embodiments, the inventive door or window locking apparatus is a "drop-in" replacement for existing door or window locking apparatuses and may be marketed as upgrade products that easily replace the existing door or window locking apparatuses in homes, commercial buildings, and other structures, without limitation. This "drop-in" replacement feature of the invention is one of the objects of embodiments of the invention having great commercial value, and is a feature understood by the inventor to not be found in the prior art. The "drop-in" feature of the invention need not be present in all embodiments, such as embodiments in which the invention is adapted to new products, or older, existing products in which the volume, shape or configuration of the window or door frame void that is left after removal of the existing locking apparatus must be modified, such by enlarging or re-shaping using cutting tools and the like, so as to accept the locking apparatus of the invention.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating exemplary embodiments of the invention and are not to be construed as limiting the invention. In the figures, like callouts refer to like features. In the drawings:

In FIG. 21, the locking apparatus has been placed in an unlocked state.

In FIG. 22, the locking apparatus has been placed in a locked state.

Figure 1A:
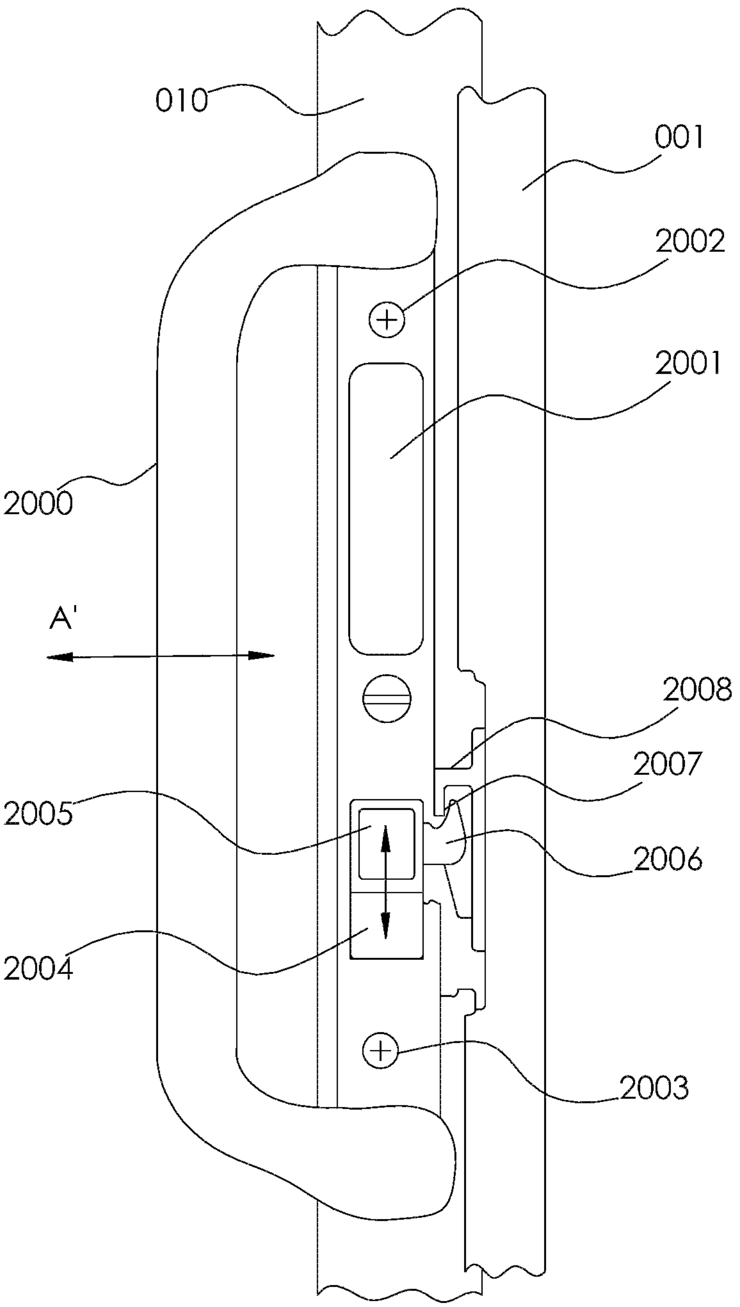
FIG. 1A depicts a sliding glass door lock of the prior art, which is replaced by the present invention, which provides improvements on the state of the art.

In the figures, like callouts refer to like elements. The relative scale of features depicted in the figures is exemplary in nature. The embodiments of the invention are intended to include not only the elements and features as depicted in the figures in exemplary fashion, but all legal equivalents thereof.

DETAILED DESCRIPTION OF THE INVENTION

The following documentation provides a detailed description of the invention.

Although a detailed description as provided in this application contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus, the scope of the invention should be determined by the appended claims and their legal equivalents, and not merely by the preferred examples or embodiments given.

The shape and relative size of the features of the invention as described herein and depicted in the drawings are intended to be exemplary only and not to be limiting. Said another way, the scale of features depicted in the drawings is not intended to be limiting.

As used herein, "controller" or "processor" includes within its meaning any integrated circuit, collection of interconnected electrical or electronic components, programmable logic array, field programmable logic array or any other electrical or electronic structure, or any combination of the foregoing, that is able to read non-transitory computer readable and executable instructions from memory and to execute such instructions for carrying out the functions, features and steps of the invention as described herein.

As used herein, "adapted to" when referring to a controller, processor, mobile device or computer includes within its meaning an ability of the controller, processor, mobile device or computer to read and execute non-transitory computer readable and executable instructions that may be stored in one or more computer readable physical media devices, such as any memory device, that is in electrical or data communication with the controller, processor, mobile device or computer, for carrying out the functions, features and steps of the invention as described herein. "Adapted to" further means that the controller executes the computer readable and executable instructions and, in response operates to control the features and elements of the locking apparatus to carry out the described and depicted functions, features and steps of the invention.

As used herein, "adapted to", when referring to a physical feature or element, includes within its meaning begin shaped, sized, configured, arranged, oriented or otherwise disposed so as to perform or exhibit the attribute, nature or feature described.

As used herein, "electronic device", "mobile device", "computer" and "server" include within their meaning any device that comprises a processor or controller, and is able to access the World Wide Web, Internet, or other data network through any wired or wireless means, such as, for example wired serial or parallel data communications networks, or via WiFi®, Bluetooth®, or any other radio frequency wireless data connection; is able to read and execute non-transitory computer readable and executable instructions that may be stored in computer readable physical media that is in data communication with the device controller; is able to be in communication with and comprises any number or combination of, and able to accept user input through, input devices such as, for example, keyboards, mouse pads, touchscreens, audio commands via a microphone, or any other known means for inputting information or commands that is in data communication with the mobile device controller, and are able to display output information on at least one or more visual displays that are in data communication with the mobile device controller. Further such devices may comprise electronic structure, non-transitory computer readable and executable instructions, and transceivers that are communication with data communication networks such Local Area Networks (LANs), Wide Area Networks (WANs) and other networks for communicating with other devices, such as, for example, via the World Wide Web using internet or other communication protocols. Further, such devices may comprise non-transitory computer readable and executable instructions for providing or accessing web portals via web sites that are addressable on the World Wide Web, such instructions operable to enable the device to input data to such web portals, and to receive and display information communicated to the mobile device by such web portals. Such devices may comprise microphones that are in communication with the processor or controller, for accepting audio input data from a user; and such devices may comprise speakers in communication with the processor or controller for outputting audio information and signals. Non-limiting examples of mobile devices include smart cell phones, tablets, and laptop computers. Non-limiting examples of servers include any type of computer or electronic device. The mobile devices, computers, and servers described herein may located in any geographic location and, as such, they are not required to physical proximate to the door locking apparatus in order to operate as herein described.

As used herein, "electromagnetic wireless charging" includes within its meaning any type of wireless charging that uses an electromagnetic field to transfer energy between two objects using electromagnetic induction. Electromagnetic wireless charging may be accomplished by the use of an induction charger comprising a generating induction coil that creates a changing, or alternating, electromagnetic field, where a receiving induction coil placed within the alternating electromagnetic field will develop an electric current in the presence of the electromagnetic field. In this manner, electric power is transferred wirelessly from the generating induction coil to the receiving induction coil through the changing electromagnetic field. In embodiments, the electromagnetic wireless charging of the invention may comprise resonant inductive coupling for greater charging efficiency.

As used herein, references to "indoor" and "outdoor" designations are for convenience of illustration and explanation of the features and operation of the locking apparatus, and are not to be taken as strictly only meaning "indoor" or "outdoor" or that each use case must be an indoor/outdoor use case. The locking apparatus may be utilized in indoor/indoor and outdoor/outdoor use cases as well.

As used herein, "door", "window" and "door or window" are used, generally, to refer to any structure that is intended to be secured to a receiving structure. Such structures may be an actual door or window, or may be any structure. While such structures may be planar in shape such as a typical door or window, they are not necessary planar in shape, and they do not necessarily need to be intended to close or occlude an opening.

As used herein, "low-voltage" wiring includes within its meaning any wiring intended to carry, or actually carrying, any electric voltage that is less than 110 VAC house voltage. In embodiments, low-voltage wiring may, as an example, be intended to carry, or actually carry, a direct current (DC) voltage of less than 20 VDC, such as 12 VDC.

In embodiments, the locking apparatus base plate 107, slide car 115, and locking pin 105, and the other elements described herein that are attached to these features, form an assembly that comprise a locking apparatus first portion 100, that is adapted to be located within a void 500 located in a window or door frame 010. Pin locking tab 200, which may comprise a pin locking tab base 203 that is attached to a receiving structure such that pin locking tab 200 protrudes through an opening in the base plate when the door or window 003 is in a closed position, comprises a locking apparatus second portion. In other words, the first portion 100 is mounted on or in the door or window 003 and moves with the door or window, and the second portion is mounted on or in the receiving structure, and does not move with the door window 003.

Referring now to FIG. 1A, a legacy, sliding glass door lock of the prior art, which, may be replaced by embodiments of the locking apparatus of the present invention as a "drop-in" replacement, is depicted for comparison purposes to the locking apparatus of the present invention. The legacy, prior art device may comprise a handle 2000, a recess 2001 that operates as a finger grip or handle for grasping allowing a user to motivate a door or window having a frame 010 in the directions shown by arrow A' in order to open or to close the door or window to, a locking hook 2006 engage a locking catch 2008 such as at point 2007 in order to latch the door closed and locked, which may be motivated up or down along arrow 2004 by a user inserting a finger into recess 2005, the recess 2005 forming a part of a structure that is connected to locking tab 2006. Locking hook 2006 is typically formed of thin sheet metal or similar material which may easily be bent or deformed by an application of sufficient force on recess 2001 by an unauthorized person attempting to pull the door or window away from wall frame 001, thus allowing such a person to forcibly open the window or door, and allowing undesired, unwanted, unauthorized entry to a building or other structure. This locking hook 2006 and catch 2008 arrangement is thus easily overcome and defeated by application of manual force, allowing an unauthorized person to defeat the prior art lock and gain undesired entry into a building that was intended to be secured from such unwanted entry. This is a significant weakness of the legacy locking apparatuses of the prior art as depicted in exemplary fashion in FIG. 1A. It is an object of the locking apparatus invention to overcome this weakness of the prior art and to provide a more secure, physically robust locking apparatus that cannot be easily forced open, and thus the locking apparatus of the invention is an improvement over the prior art and prevents unwanted, unauthorized entry to a building or other structure. The locking apparatus of the present invention does not use a sheet metal locking hook 2006 and catch 2008 arrangement to latch the door or window closed.

Figure 1B:
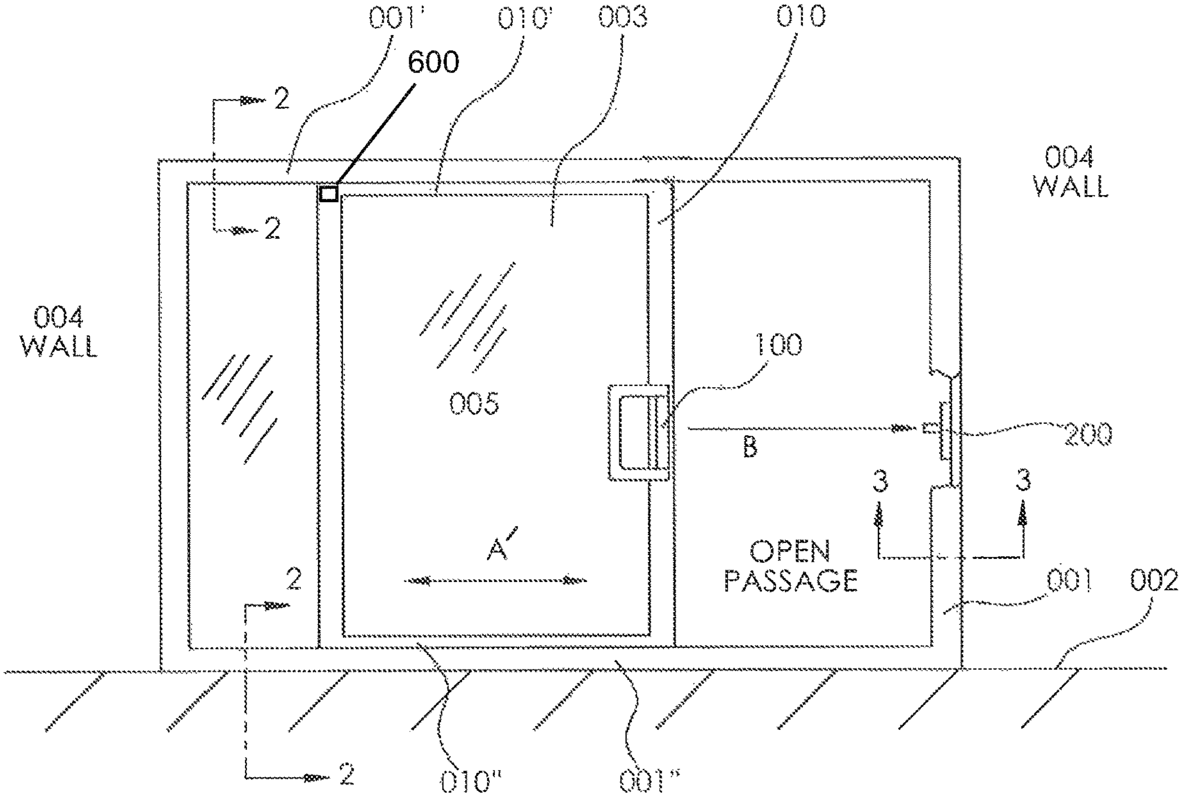
FIG. 1B depicts a view of a sliding glass door embodiment, or use case, which is just one exemplary embodiment of many embodiments of the invention. In this figure the sliding glass door is shown in an open state, presenting an open passage so that a user may pass through the doorway. In this example, locking apparatus first portion 100 is depicted partially disposed in void 500.

Referring now to FIG. 1B, a view of an exemplary embodiment of the door locking apparatus of the invention, in which the door locking apparatus is operable to secure a sliding door or window, is depicted. This use case is just one, non-limiting, exemplary application of the invention. Although a sliding door is depicted in the figures, this is only for ease of illustration. The locking apparatus of the invention may be operable with, and used on, any window or door, which does not necessarily need to be a sliding window or door. While a sliding door or window 003 is depicted in this particular figure, this is simply an exemplary use case depicted for convenience of illustration. The exemplary sliding door or window 003 may comprise glass 005 in the case of a sliding glass door, or may comprise any other material. The apparatus of the invention may be utilized not only on a sliding glass door (as depicted) but on any sliding or swinging door, sliding window, swinging window, or other structure. In FIG. 1B the sliding door or window 003 is shown in an open state, presenting an open passage so that a user may pass through the doorway. In a typical sliding door use case, sliding glass door or window 003 is able to be motived in both directions along its bottom frame (or track) 001' as shown by A'. Sliding door or window 003 may be motived along its track 001' in the direction of arrow B towards a closed position, or closed state, where door (or window, etc.) frame 010 comes into contact with and is received by a receiving structure such as, for example, wall frame 001, and wherein pin locking tab 200 enters into and is received by a first portion 100 of the locking apparatus of the invention as is further described herein. The indoor portion of the first portion of the invention may be protected by a cover 103. A locking pin 105 (not shown in FIG. 1B, but shown in other figures such as FIG. 6B) which is part of the first portion of the door locking apparatus that is attached to sliding door or window 003, may be controlled or motivated to engage pin receiving opening 201 (not shown in FIG. 1B, but shown in FIG. 3) in pin locking tab 200 so as to securely lock sliding door 003 thus preventing it from being opened. i.e. motivated in a direction opposite arrow B, unless and until locking pin 105 is disengaged from pin receiving opening 201 in pin locking tab 200. When sliding door or window 003 is in a closed state and locking pin 105 is inserted into and received by pin receiving opening 201 in pin locking tab 200, the sliding door or window 003 is in a locked state in which the open passage is closed and an unwanted or unauthorized person is not able to pass through the door or window, and is unable to be opened by a manual force unless and until locking pin 105 is withdrawn from pin receiving opening 201 in pin locking tab 200. When locking pin 105 is withdrawn, or disengaged, from pin receiving opening 201 in pin locking tab 200, the window or door 003 is in an unlocked state, and the sliding door or window 003 is able to be opened by motivating it along its bottom track 001' in a direction opposite arrow B, creating an open passage through the sliding door or window 003. Wall 004 and floor or ground surface 002 are shown for reference. In embodiments, a portion of wall 004 may act as a receiving structure to which pin locking tab base 203 is attached. The door or window frame 010 may have an upper portion 010' that is slidably engaged with an upper track or other shaped portion of door frame 001'. First portion 100 may comprise an optional handle as depicted in FIG. 1B.

Figure 24:
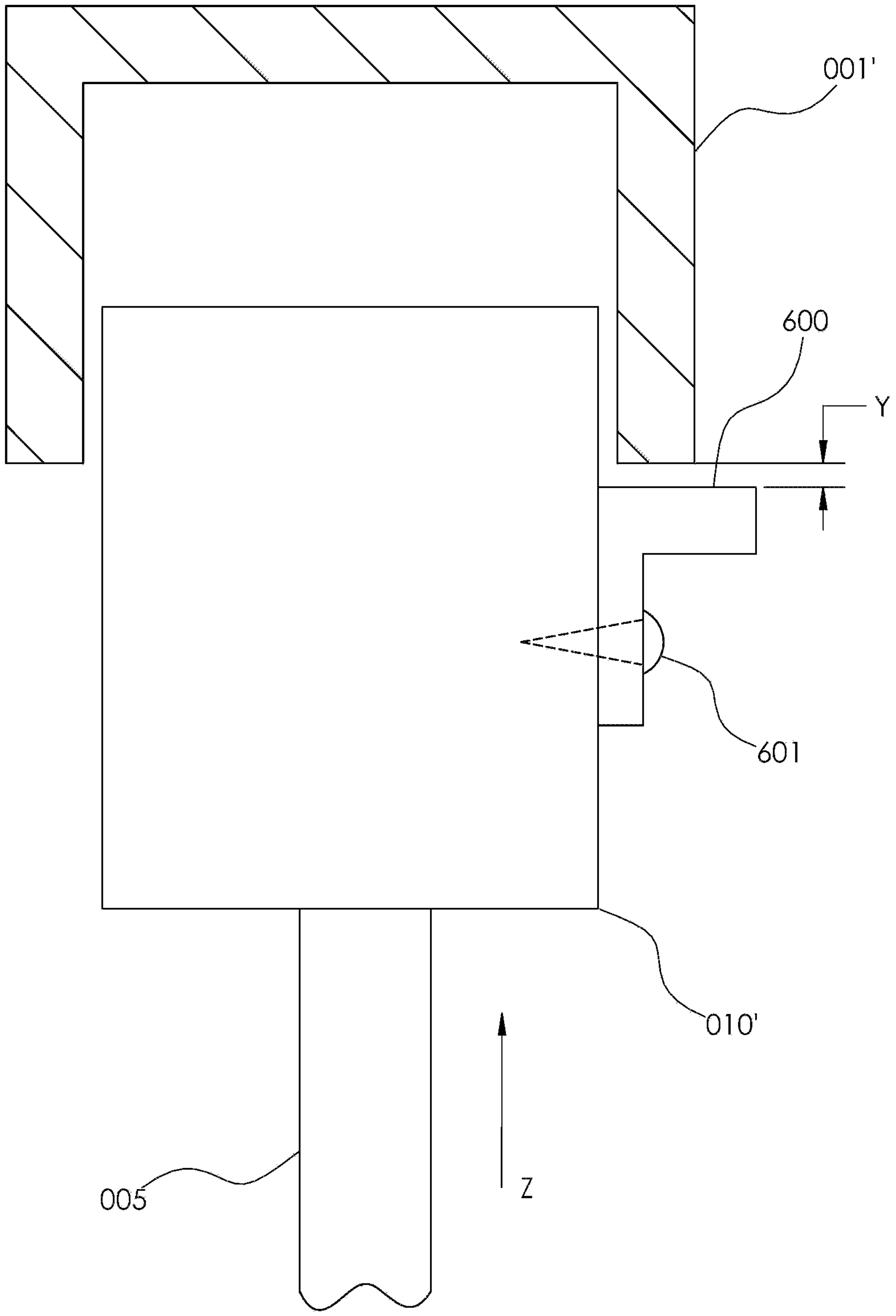
FIG. 24 depicts an exemplary embodiment of an anti-left feature of the invention that prevents a sliding door or window from being lifted from a bottom track.

Still referring to FIG. 1B, optional door lift preventer 600, which is described in further detail below in reference to FIG. 24, is depicted.

In embodiments, locking pin 105 may be controllable so as to engage or disengage pin receiving opening 201 in pin locking tab 200 via a controllable actuator 113, as further described herein. Controllable actuator may comprise an extendable portion to which locking pin 105 is attached by, for example, a pinned or threaded attachment. The extendable portion of actuator 113 may be extended by commands communicated to actuator 113 by, for example, controller 1000 (see FIG. 23). In embodiments, locking pin 105 may be motivated manually so as to engage or disengage pin receiving opening 201 in pin locking tab 200, for example by the twisting or rotating of knob 104, or by the rotation of a mating key in key lock 900 (see FIG. 27), as further described herein.

Figure 2:
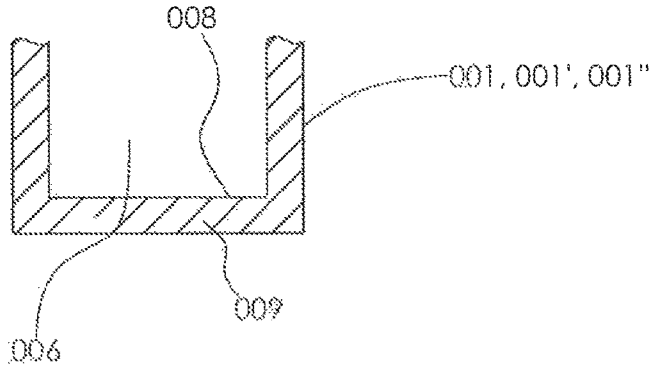
FIG. 2 depicts a cross section view of an embodiment of a bottom portion of a frame in which door or window 003 slides. In embodiments, the U-shaped cross section forms a track that may be slidably engaged with a frame of a door or window 003, allowing door or window 003 to be translated along the track.

Referring now to FIG. 2, an exemplary cross section configuration of wall frame 001, 001' or 001" is depicted. In this exemplary embodiment, wall frame 001, 001' or 001" may comprise a channel configuration 006 having a wall thickness 009 that is adapted to receive door frame 010, 010', or 010", respectively. In embodiments, the channel configuration 006 of wall frame 001" may receive the bottom portion of door frame 010" in a sliding engagement, and thus act as a track for the sliding engagement of door or window 003. Friction-reducing components such as, for example, lubricants, Teflon or Delrin bearings, or small rotating wheels or spherical bearings, may be placed between surface of door frame 010" and, for example, surface 008 of wall frame 001 so as to reduce friction between them, and to enable smooth sliding of door or window 003 in the channel 006 which creates a bottom track of door frame 001.

Figure 3:
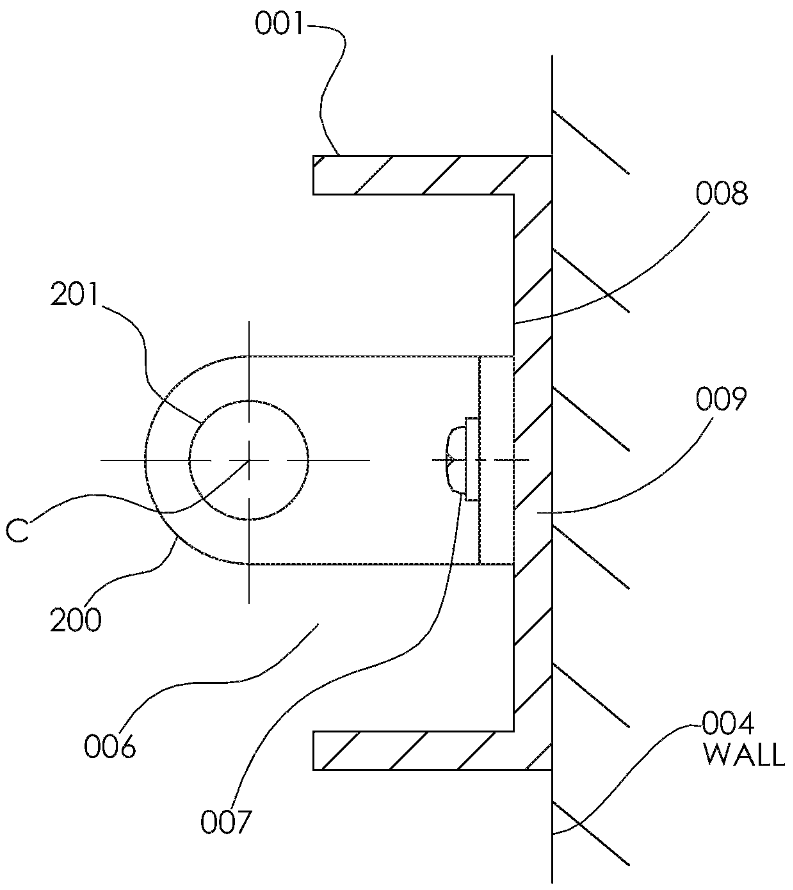
FIG. 3 depicts a cross section view of a portion of an embodiment of a wall frame in which pin locking tab 200 is attached.
Figure 4:
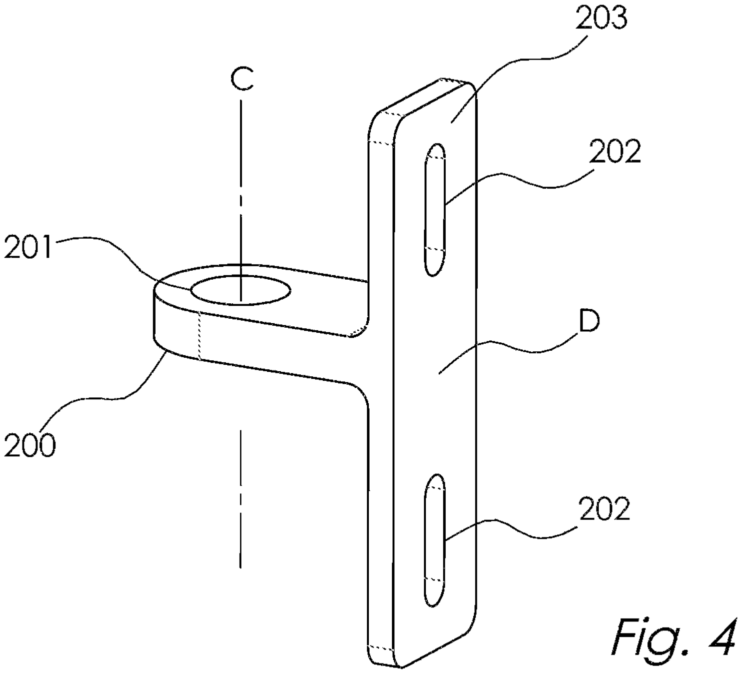
FIG. 4 depicts a perspective view of an exemplary embodiment of pin locking tab 200 having a pin receiving opening 201 for receiving a distal end of locking pin 105.

Referring now to FIGS. 3 and 4, a cross sectional view of a portion of wall frame 001, which may be a receiving structure for receiving the door or window frame 010 (not shown in FIG. 3, but shown in FIG. 1), in which pin locking tab 200 is attached, is depicted. Pin locking tab 200 may comprise a pin receiving opening 201 for receiving and engaging locking pin 105 (not shown in FIG. 3, but depicted for example in FIG. 6B). In embodiments, pin locking tab base 203 (not shown in FIG. 3, but depicted for example in FIG. 6B) may be removably or otherwise attached to wall frame 001, or equivalent structure, for example by threaded fasteners 007, or it may be fixedly attached by any means such as chemical bonding, welding or brazing, for example, or it may be formed as an integral part of wall frame 001 by any means such as, for example, casting, additive manufacturing, molding or any other means of manufacture. All equivalent structures for the wall frame 001 and pin locking tab 200, and all equivalent means of forming wall frame 001 and pin locking tab 200, and all equivalent means for attaching pin locking tab 200 to wall frame 001 in those embodiments in which wall frame 001 and pin locking tab 200 are not formed as an integral structure, are included within the scope of the invention. Pin receiving opening 201 may have a center axis C that, in embodiments, is coaxial with an axis of controllable locking pin 105 when pin locking tab 200 has been received by the first portion 100 of the locking apparatus, such as, for example, when door or window 003 are in a closed position or state. In the portion of wall frame 001 that operates as a receiving structure for receiving the door or window frame 101, surface D of pin locking tab base 203 may be attached to surface 008 of wall frame 001, which may be attached to wall 004. References to channel 006 and wall thickness 009 are provided for reference.

Referring now to FIGS. 3 and 4, a perspective view of an exemplary embodiment of pin locking tab 200 attached to receiving structure 001 is depicted. Pin receiving opening 201 having axis C is shown for reference. In embodiments, elongated openings, or slots, 202 may form a part of pin locking tab base 203. In those cases in which pin locking tab base 203 is attached to a receiving structure, such as wall frame 001, by threaded fasteners 007 extending through elongated slots be threadingly engaged with the receiving structure 001 or a supporting structure such as wall 004, elongated openings 202 may be useful for allowing adjustment of the location of locking tab 200 along the receiving structure such that, when a receiving structure comprising a locking tab 200 receives the door or window frame 010 of a door or window 003 in a closed state or position, locking tab 200 is lined up with the opening 012 in the locking apparatus (depicted in FIG. 5A) so that opening 012 may receive pin locking tab 200. This is but one exemplary embodiment of a means for providing an adjustable attachment of pin locking tab base 203 to a receiving structure such as wall frame 001. Any other means for providing an adjustable attachment of pin locking tab 200 to wall frame 001 as is known in the art is included within the scope of the description and appended claims. Surface D may be the surface of pin locking tab base 203 that is in physical contact with, and attached to, a surface 008 of exemplary receiving structure wall frame 001 as depicted in FIG. 3. The attachment of tab base 203 to surface 008 of exemplary receiving structure wall frame 001 may be a removable attachment via threaded fasteners 007.

Regarding FIGS. 5A-19, various views of the components, features and functions of exemplary embodiments of the inventive locking apparatus for securing doors or windows are depicted. Some of these views are presented in cross section, and some views depict specific states of the apparatus, such as "locked", "unlocked" and "override". First, the internal components of the invention are described in reference, generally, to FIGS. 5A-20. Next, references to specific figures are provided in order to describe the structure and operation of the invention in its various states, and to describe how the invention transitions from state to state. It is to be understood that the embodiments depicted in the figures and described herein are exemplary as may be used, for example, int the non-limiting case of securing a sliding glass door as depicted in in FIG. 1. However, the shape, proportions, and physical appearance of the apparatus of the invention may differ for different types, dimensions, proportions, configurations and styles of windows or doors that are secured by the inventive locking apparatus. It is intended that all such differences, proportions, and physical appearances of the apparatus of the invention are within the scope of this description, the figures and their legal equivalents, and the appended claims.

Figure 5A:
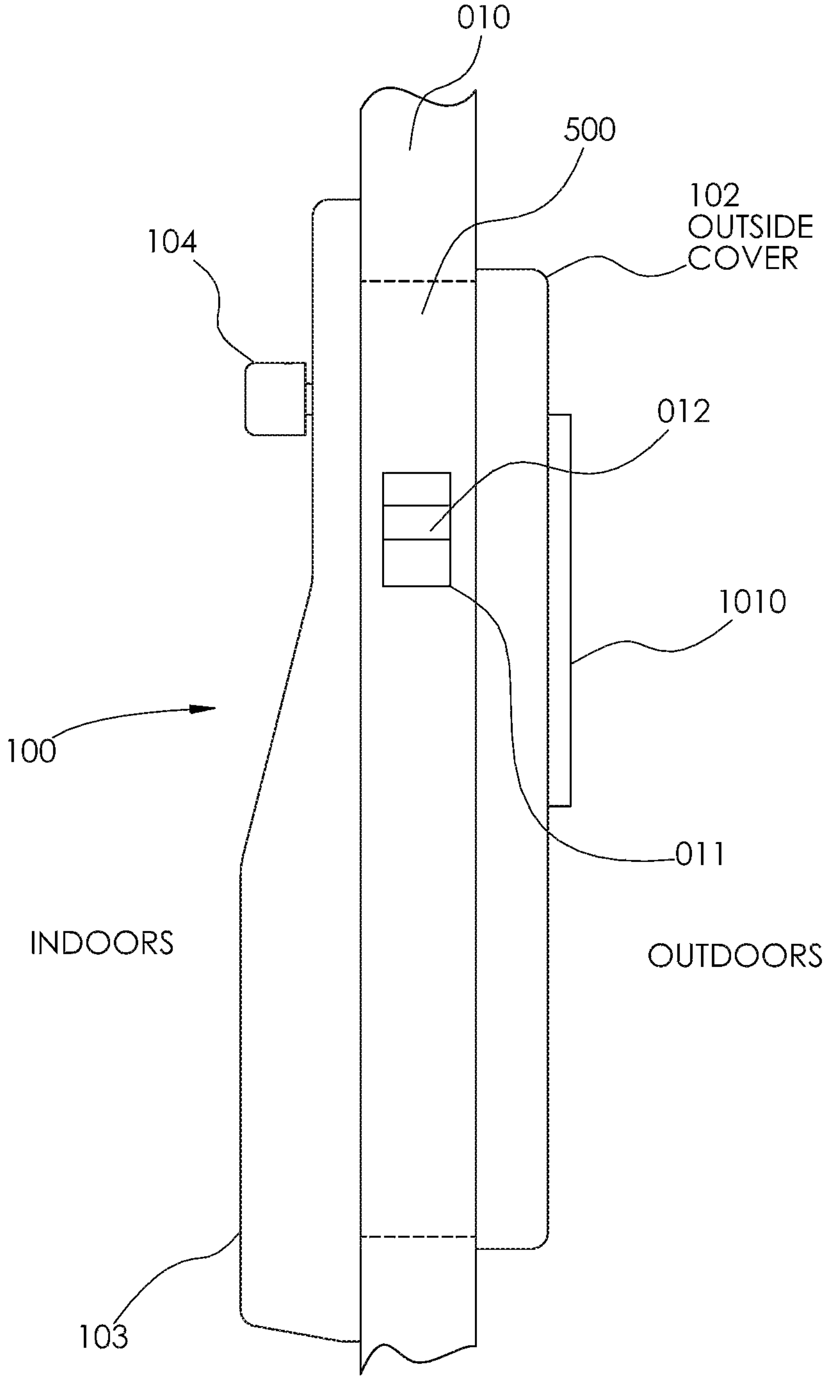
FIG. 5A depicts a side view of an embodiment of window or door frame 010, and showing the locking apparatus first portion 100 assembled onto the door frame 010 in void 500.
Figure 5B:
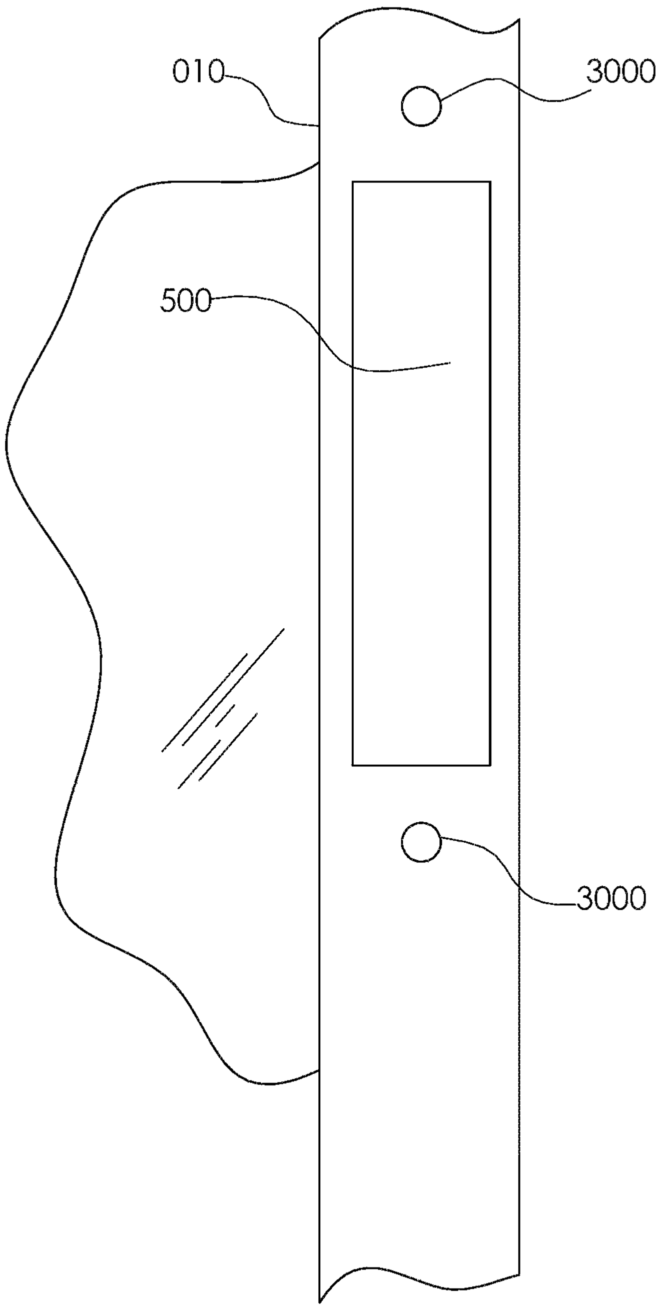
FIG. 5B depicts a side view of an embodiment of window or door frame 010, showing void 500 in window or door frame 010 for receiving the locking apparatus first portion.
Figure 5C:
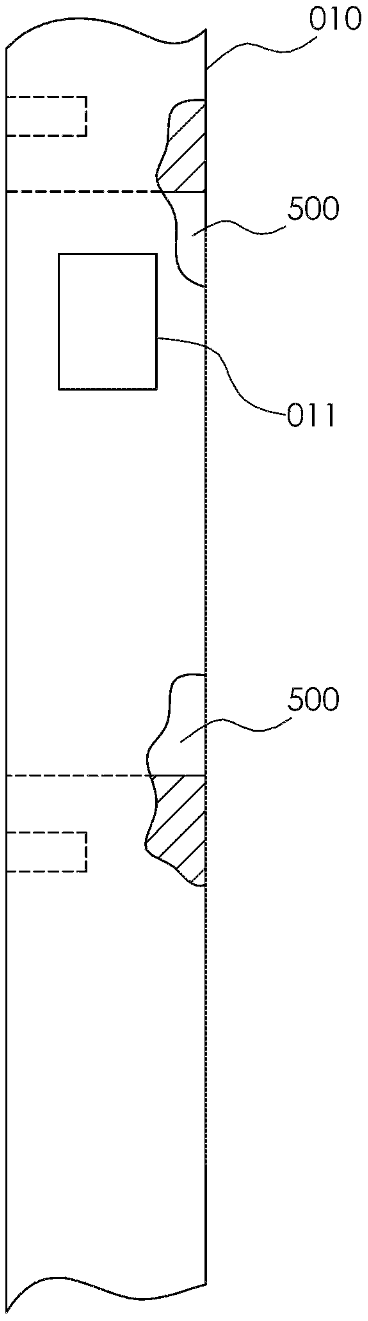
FIG. 5C depicts a side view of an embodiment of window or door frame 010, the locking apparatus first portion 100 is not shown, so that that the void 500 for receiving the locking apparatus first portion may be clearly depicted.

Referring now to FIGS. 5A-5C, an exemplary embodiment of the apparatus of the invention is depicted in which first portion 100 is mounted into void 500 located in door or window frame 010. Door or window frame 010 may comprise an opening 011 that allows pin locking tab 200 to pass through door or window frame 010, to be received by opening 012 in the locking apparatus. In embodiments, outdoor cover 102 may make a weathertight seal with an outdoor surface of door or window frame 010. User input device 1010, which may be, for example, a keypad, may be disposed on outdoor cover 102 so that a user may input a code or command to unlock the locking apparatus, commanding the controller 1000 to place the locking apparatus into an unlocked state that allows the door or window 003 to be opened.

Referring now to FIGS. 5A-20, an exemplary embodiment of the locking apparatus first portion 100 is depicted. Cover 103 may cover an indoor portion of the first portion 100 of the locking apparatus, and cover 102 may cover an outdoor portion of first portion 100 of the locking apparatus. The apparatus may comprise a handle or knob 104 disposed on the indoor portion of the apparatus that is useful for locking the apparatus, unlocking the apparatus, or both. The window or door 003 that is securable by the apparatus may comprise a door or window frame portion 010 on a side of the window or door that is brought into contact, or into near contact, with a receiving structure such as, for example, wall frame 001 when the door or window is in a closed state. The door or window frame 010 may comprise an opening 011 that allows pin locking tab 200 to pass through door or window frame 010 and to be received by opening 012 in the first portion 100 of the locking apparatus, such that pin receiving opening 201 in locking tab 200 may be brought into alignment, which may be an axial alignment, with locking pin 105 when door or window 003 is in a closed state, allowing actuator 113 to be controlled by controller 1000 to extend locking pin 105 into pin receiving opening 201, and, in embodiments, extending locking pin 105 such that a distal end of locking pin 105 passes through pin receiving opening 201 in locking tab 200 to then be received by locking pin receiving recess 111 in pin receiving block 106, creating a highly secure capture of locking pin 105 by two structures—pin receiving opening 201 in pin locking tab 200 and locking pin receiving recess 111 in pin receiving block 106. This capture of secure capture of locking pin 105 in pin receiving opening 201 in locking tab 200; or, optionally, by two structures, namely pin receiving opening 201 in locking tab 200 and locking pin receiving recess 111 in pin receiving block 106, provides a much more secure locking of door or window 003 to wall frame 001 than is provided by locking systems of the prior art, which generally utilize only sheet metal tangs and the like to secure the door or window 003 to a wall frame. Opening 012 may be established by a gap between the distal end of locking pin 105 when it is in an unlocked state or position, and the surface of pin receiving block 106 in which locking pin receiving recess 111 is located.

Figure 26:
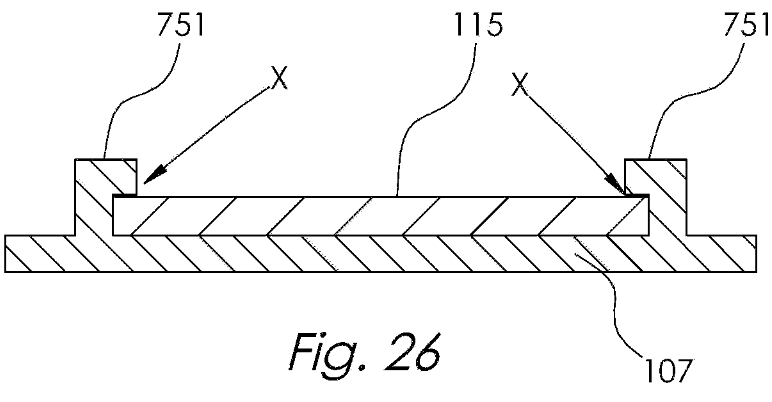
FIG. 26 shows a cross sectional view of an embodiment of a slide car sliding engagement with the track portion(s) 751 of base plate 107.

Still referring to FIGS. 5A-20, actuator 113 may be attached to slide car 115 that is slidably engaged with base plate 107 (the sliding engagement between slide car 115 and the tracks 751 in base plate 107 at points X being depicted in FIG. 26), and, further, compression spring 101 may exert a force J on slide car 115, tending to motivate slide car 115 in the direction of arrow J. In embodiments, base plate 107 may also comprise pin receiving block 106 that further comprises locking pin receiving recess (or opening) 111 for receiving a distal end of locking pin 105 when the locking apparatus has been placed in a locked state. In embodiments, pin receiving block 106 may be attached to or form a portion of a structure 800 that is attached to base plate 107 for example by a threaded standoff 112 attached to base plate 107 and structure 800, by other threaded attachment or by any other means known in the mechanical art.

Still referring to FIGS. 5A-20, in embodiments, the electrical and electronic components comprising the invention, such as, for example, controller 1000, one or more battery(s) 1002, and so on may be housed within an enclosure 114.

Referring now to FIGS. 6A, 6B, 9A, 9B, 15, 16, and 17, embodiments of the locking apparatus are depicted in a locked state in which locking pin 105 is in an extended state, as having been commanded by operation of controller 1000 controlling actuator 113 to extend, or, in manually operated embodiments, by rotation of rotatable knob 104 allowing force J provided by compression spring 101 to motivate slide car 115 along its sliding engagement with tracks 751 in base plate 107 such that locking pin 105 is received by pin receiving opening 201 in pin locking tab 200, and, in embodiments, by locking pin receiving recess 111 in pin receiving block 106. If door or window 003 is in a closed state and the locking apparatus is in the state depicted in FIGS. 6A. 6B, 9A, 9B, 15, 16, and 17, the door or window 003 is in a locked state, or condition, in which the door or window is unable to be opened unless the locking apparatus is transitioned to an unlocked or an override state. In embodiments, when the locking apparatus is in a locked state, pin locking tab 200 has been received by opening 012 such that locking pin 105 is coaxially located with pin receiving opening 201 in pin locking tab 200. In the exemplary embodiment depicted in FIGS. 6A and 6B, locking pin 105 has also passed through pin receiving opening 201 in pin locking tab 200 and has been extended into locking pin receiving recess 111 of pin receiving block 106. Compression spring 101, pin locking tab base 203, locking tab mounting surface D, rotatable knob shaft 108, outdoor cover 102, and base plate 107 are shown for reference.

Referring now to FIGS. 7A, 7B, 10A, 10B, 12, 13, and 14, embodiments of the locking apparatus are depicted in an unlocked state in which locking pin 105 is in a retracted state, as having been commanded by operation of controller 1000 (shown in FIG. 23) controlling actuator 113 to retract, motivating slide car 115 along its sliding engagement with tracks 751 in base plate 107 due to actuator 113's attachment to slide car 115, such that locking pin 105 is translated away from, and out of, pin receiving opening 201 in pin locking tab 200 and, in embodiments, also motivating locking pin locking pin 105 out of receiving recess 111 of pin receiving block 106. Thus, in FIGS. 7A, 7B, 10A, 10B, 12, 13, and 14, door or window 003 is in an unlocked state in which it can be opened (or closed) by a user, allowing entry to the building or other structure.

Figure 21:
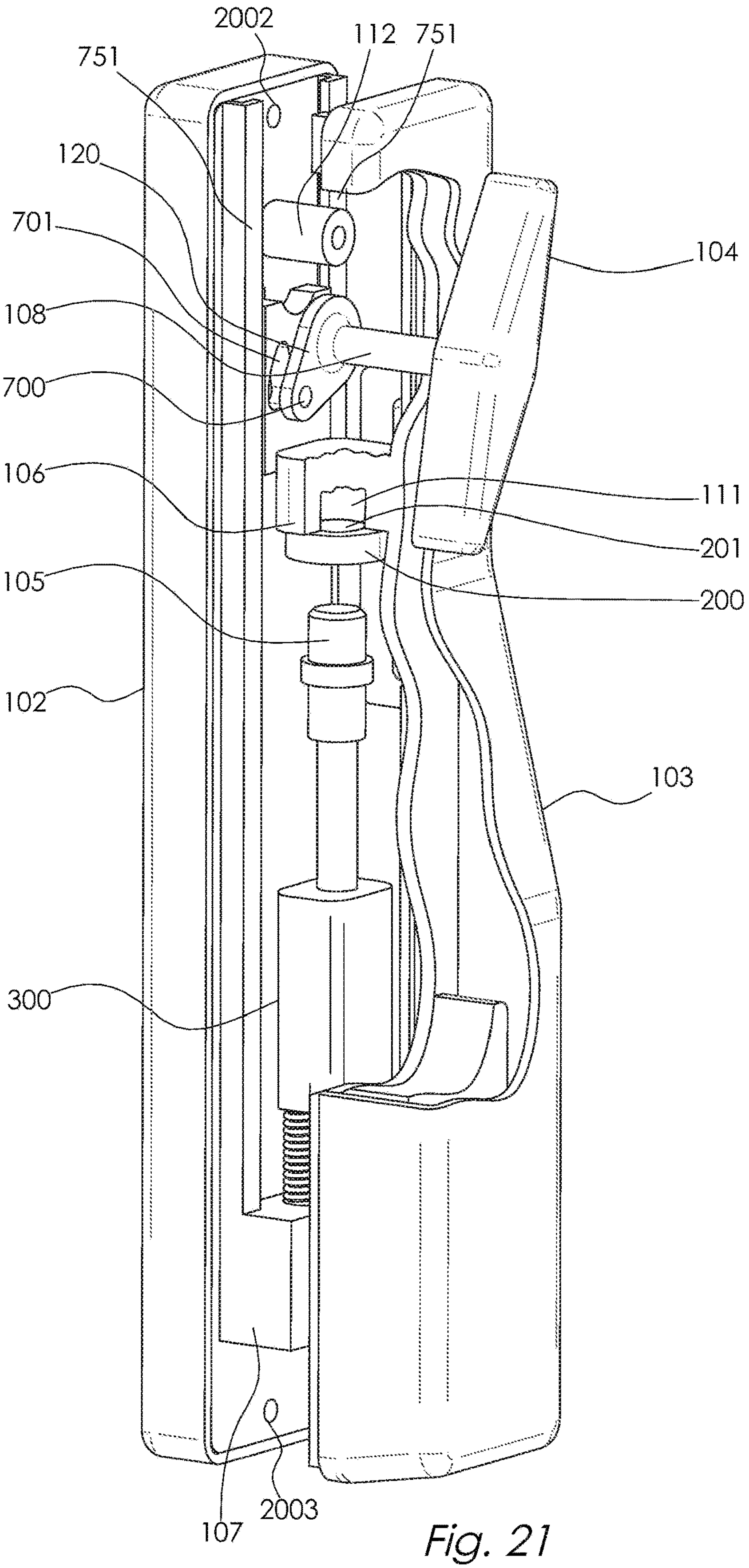
FIG. 21 depicts a perspective view of an embodiment of the invention that may be manually operated and therefore does not need electrical power to be operated. I.e., no electrical power is necessary to place the locking apparatus of the invention into a locked state or an unlocked state.
Figure 22:
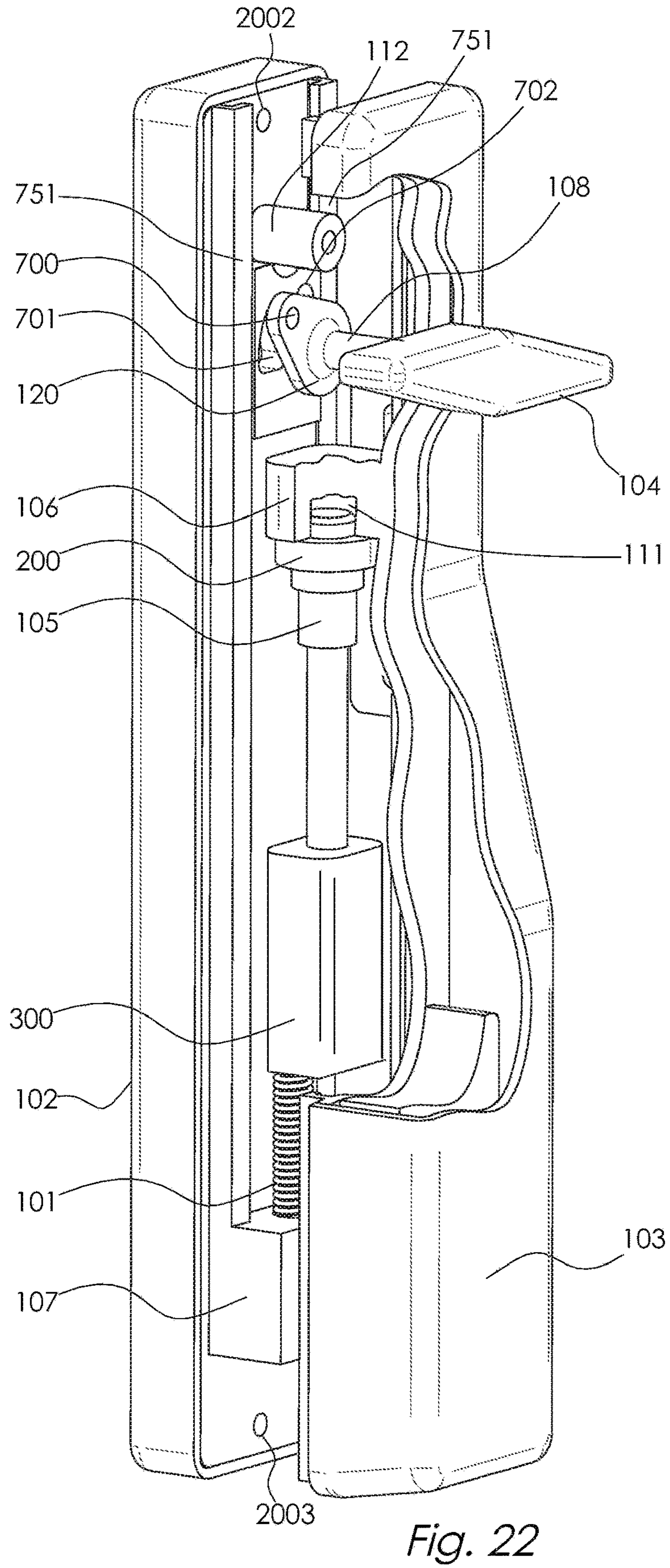
FIG. 22 depicts a perspective view of an embodiment of the invention that may be manually operated and therefore does not need electrical power to be operated. I.e., no electrical power is necessary to place the locking apparatus of the invention into a locked state or an unlocked state.
Figure 25:
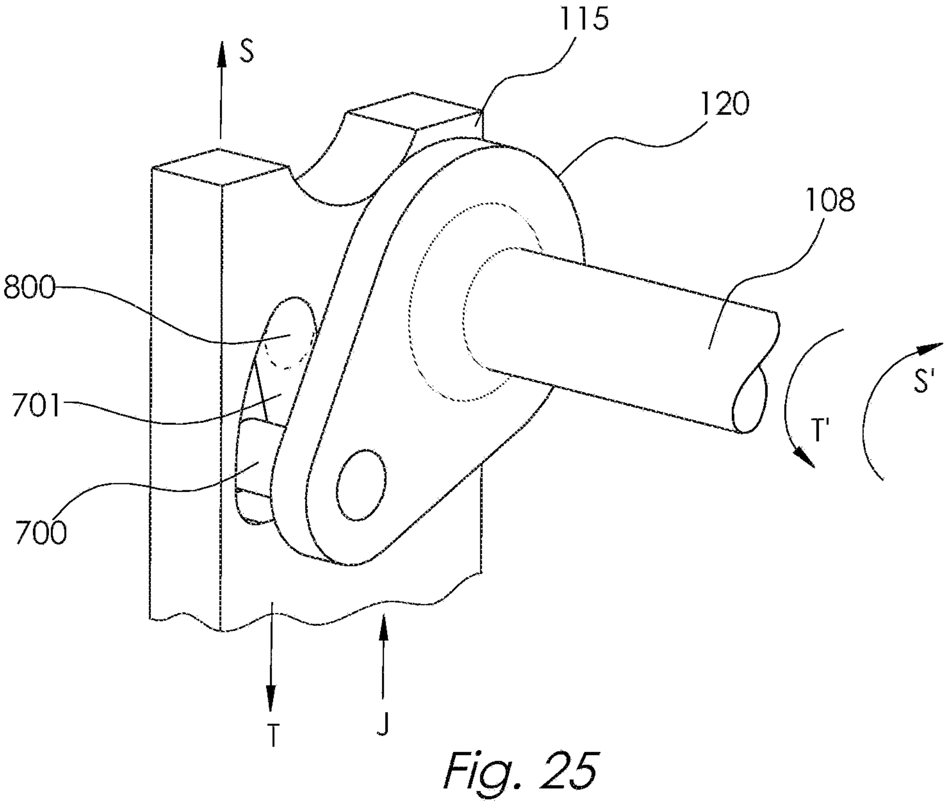
FIG. 25 depicts a perspective view of an exemplary embodiment of a mechanism for carrying out the manual override or manual unlocking function of the invention, in which the locking apparatus is manually placed into a locked state or an unlocked state.
Figure 27:
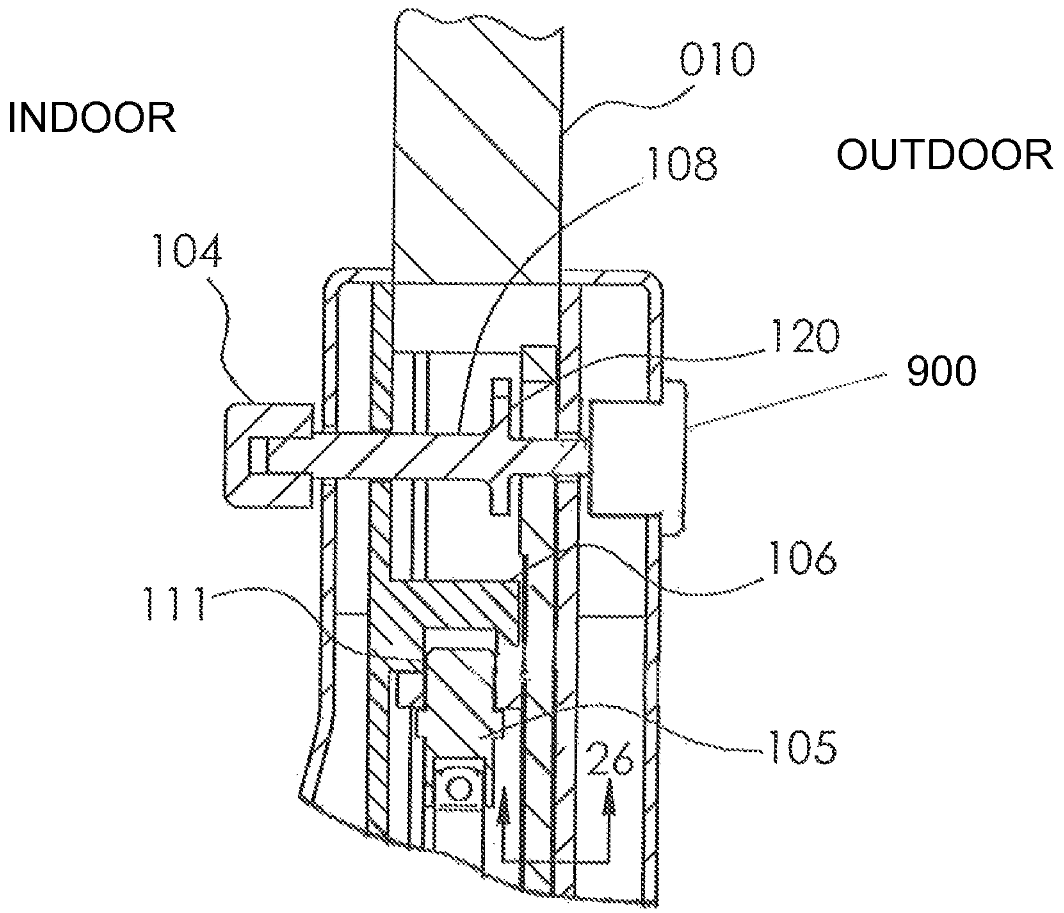
FIG. 27 depicts a cross section view of an embodiment of the locking apparatus of the invention having a manual key lock for manually placing the locking apparatus in a locked or unlocked state, allowing a user to manually, with a key, lock or unlock the locking apparatus from outside the building or structure.

Referring now to FIGS. 8A, 8B, 11A, 11B, 18, 19, and 20, embodiments of the locking apparatus are depicted in an override state in which actuator 113 extendable portion has been extended by command to actuator 113, but locking pin 105 has been motivated out of its engagement with pin receiving opening 201 of pin locking tab 200 by the translation of slide car 115 along its sliding engagement with base plate 107, thus placing the locking apparatus in an override state, by the rotation of knob 104. In this override state, the locking apparatus has been unlocked by the rotation of knob 104, allowing the door or window 003 to be opened and thereby allowing entry to the building or other structure. The override state is useful for use cases in which the locking apparatus does not have access to electrical power, which may occur, for example, during a power outage; or, alternatively, in those use cases such as remote installations in which electrical power is not available. For example, in embodiments of the invention that comprise a controllable actuator 113, the locking apparatus is controllable such that controller 1000 may command actuator 113 to place the locking apparatus into a locked state by extending actuator 113 extendable portion such that locking pin 105 is received by pin receiving opening 201, or controller 1000 may command actuator 113 to place the locking apparatus into an unlocked state by retracing actuator 113 such that locking pin 105 is no longer received by pin receiving opening 201. However, in this embodiment, if electrical power is lost while the locking apparatus is in the locked state, controller 1000 would no longer be able to command actuator 113 to retract such that locking pin 105 is no longer received by pin receiving opening 201, preventing a user from unlocking the door or window, and possibly preventing their egress from the building. In such cases, a manual override that allows a user to transition the locking apparatus from a locked state to an override (unlocked) state, without the need for any electrical power to be applied to the locking apparatus, may be desired. In embodiments, this manual lock override may be provided by twisting or rotating knob 104 which is attached to rotatable knob shaft 108, causing rotatable knob shaft 108 to also rotate (see arrows S' and T' in FIG. 25). Referring to FIG. 25, rotatable knob shaft 108 may be attached to a pin 700 via a transfer plate 120. Pin 700 may engage a cutout 701, which may take the form of an arcuate slot or other shaped opening, in slide car 115. An exemplary depiction of the relationship of these components is depicted in FIG. 25. As can be seen in FIG. 25, when knob 104 is rotated in a first direction T', rotatable knob shaft 108 is also rotated in direction T' because it is connected to knob 104. Transfer plate 120, which is also attached to rotatable knob shaft 108, is rotated in a direction T', causing pin 700 to be translated in slot 701 until it bottoms out against a surface of 701. As knob 104 continues to be rotated in direction T', pin 700, which is attached to transfer plate 120 and which protrudes into slot 701, acts on a surface of slot 701, forcing slide car 115 to translate along its sliding engagement with tracks 751 in base plate 107 in the direction of T, against the opposing force J supplied by compression spring 101 acting on slide car 115 as is depicted, for example, in FIG. 8B. In this instance, locking pin 105 is also translated in the direction T, because actuator 113 is attached to slide car 115. Thus, when knob 104 is rotated in the direction T', slide car 115 is motivated to translate along its sliding engagement with base plate 107 in the opposite direction of force J provided by compression spring 101. When knob 104 has been sufficiently rotated so that locking pin 105 is translated so as to no longer be engaged with pin receiving opening 201 in locking tab 200, the door or window 003 is placed in the override state. Any of the embodiments of the invention may comprise the features depicted in FIG. 25 for manually operating the locking apparatus. Thus, the manual override feature allows a user to manually override the locked state, placing the locking apparatus in an override state, in which the locking apparatus is unlocked. In this manner a user may manually override the locked state in the case of a loss of power or the failure of an electronic component of the invention, allowing a user to manually unlock and open the door or window 003. This feature is useful when, for example, there is a power outage, or if any batteries powering actuator 113 have failed, or if a user on the indoor side of the door or window needs to manually unlock the door or window secured by the locking apparatus. Accordingly, if there is an electrical power outage, or if a user does not have access to an electronic device for controlling the locking apparatus, the user is able to unlock the door or window from the indoor side of the door or window, allowing safe egress from the building. Further, from such override state, the locking apparatus may be returned to the locked state in which locking pin 105 is engaged with pin receiving opening 201 in locking tab 200 (and, in embodiments, locking pin 105 is also engaged with locking pin receiving recess 111 in pin receiving block 106 when the locking apparatus is in the locked state) by the rotation of knob 104 in a direction which is opposite of the first direction of rotation, such as S' in FIG. 25. Such reverse rotation of knob 104 translates pin 700 in slot 701 along the direction S' such that base plate 115 is no longer forced against compression spring 101, allowing compression spring 101 to expand and, by operation of force J, motivate slide car 115 in the direction S in FIG. 25, motivating locking pin 105 into pin receiving opening 201 in pin locking tab 200, thus placing the locking apparatus in the locked state. Thus, the rotation of rotatable knob 104 may cause the locking apparatus to be placed in the locked state or the override state in which the locking apparatus is unlocked. In embodiments of the locking apparatus that are manually operated, the locking apparatus may not comprise any electronic or electric components. In such embodiments, the locking apparatus may simply be installed on a door or window and operated manually as described above, using the rotation of knob 104 from the indoor side of the locking apparatus to place the locking apparatus in a locked or unlocked state, as depicted in FIGS. 21 and 22. Such embodiments may not comprise a controllable actuator 113. From the outdoor side of the locking apparatus, an optional manual key lock may be used to manually place the locking apparatus in a locked, override or unlocked state as shown in FIGS. 25 and 27.

Figure 11B:
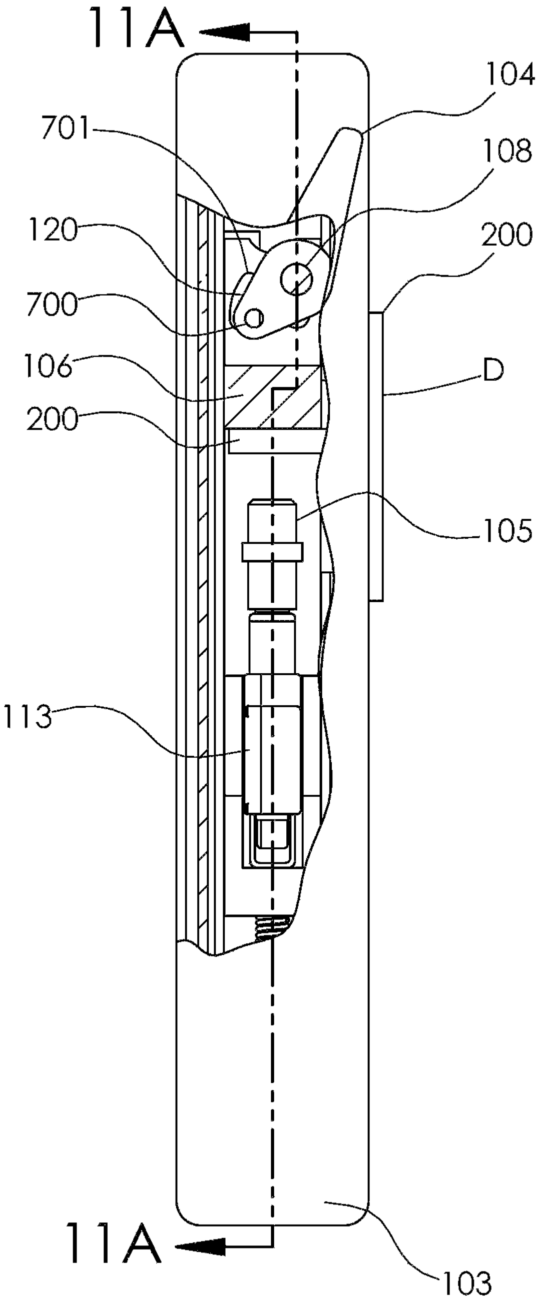
FIG. 11B depicts an embodiment of a front view of a door securing apparatus of the invention in an override, or unlocked state.
Figure 11A:
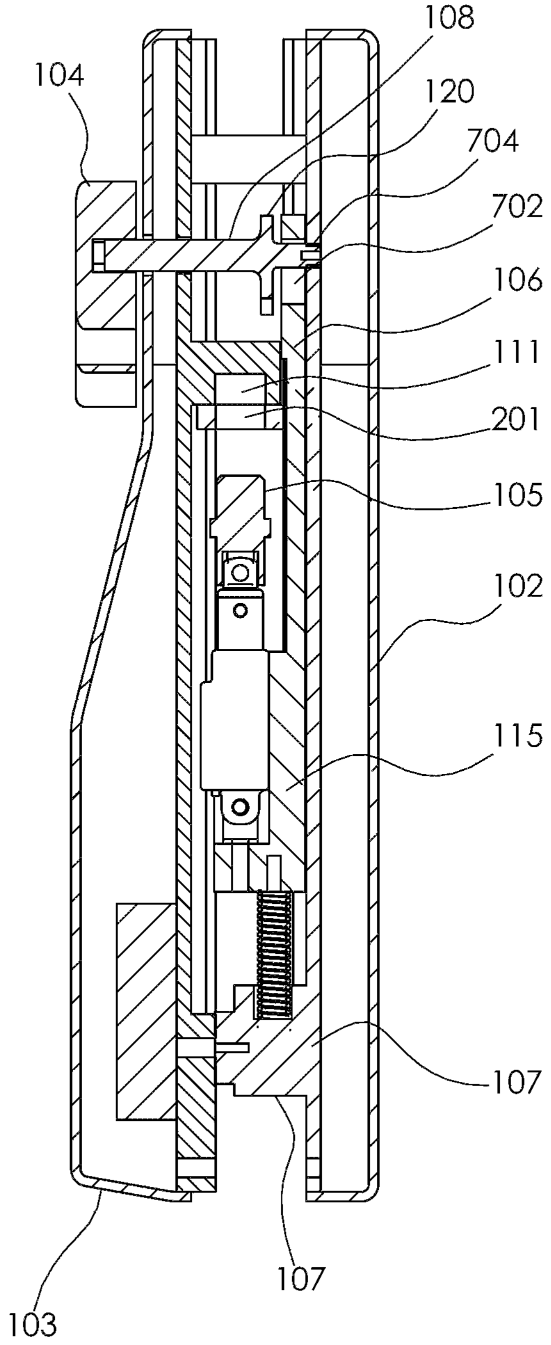
FIG. 11A depicts cross section view of an embodiment of a door securing apparatus of the invention in an override, or unlocked state.

Referring now to FIG. 11A, rotatable knob 104 may be attached to knob shaft 108 that may pass through slot 702 in base plate 107. Knob shaft 108 may be retained in a receiving opening in base plate 107 that allows knob shaft 108 to be rotatably retained by base plate 107 by rotatable attachment 704. The rotatable attachment 704 of knob shaft 108 to base plate 107 allows a user to rotate rotatable knob 108 so as to manually operate the locking apparatus, such as in override or manual use, as described herein.

Referring now to FIGS. 21 and 22, a manual embodiment of the invention is depicted in which the locking apparatus may be manually operated, meaning that the locking pin may be entirely manually operated into a locked or unlocked state. In such embodiments, the invention may comprise a manually operated assembly of components that allows a user to place the locking apparatus into a locked state or an unlocked state entirely by manual operation, i.e., without the use of any electrical power or any electrical components. In manual embodiments, the locking apparatus may not comprise any electrical or electronic components, and may not require electric power to operate. Manual embodiments are useful, for example, in situations in which electrical power is not available such as remote or "off-the-grid" installations. In FIG. 21, locking pin 105 is depicted in a retracted state, which has been achieved by the rotation of knob 104 in a direction along direction T' (as further shown in FIG. 25), forcing slide car 115 to translate along its sliding engagement with tracks 751 in base plate 107 in the direction T against the force J provided by spring 101, compressing spring 101, and translating locking pin 105 such that it is no longer received by pin receiving opening 201 in pin locking tab 200. This places the locking apparatus in an unlocked state and allows the door or window 003 to be opened. In FIG. 22, locking knob 104 has been rotated in the direction of arrow S' (opposite to direction T', see FIG. 25), such that the expanding force J provided by compression spring 101 is allowed to motivate slide car 115 in the direction of arrow S as compression spring 101 is allowed to expand, such that the distal end of locking pin 105 is translated into and received by pin receiving opening 201 in pin locking tab 200, thus placing the locking apparatus into the locked state. Locking pin 105 may be attached directly or indirectly to slide car 115. In embodiments, the attachment of locking pin 105 to slide car 115 may be a fixed or a removable attachment. Slot 702, which is depicted in FIG. 22 and also in FIGS. 6B, 8B, 9A, 9B, 10A, 11A, 12, 13, 15 and 16 allows slide car 115 to translate in its sliding engagement with the tracks 751 of base plate 107 without interfering with knob shaft 108, which may protrude through slot 702 in slide car 115.

Figure 6B:
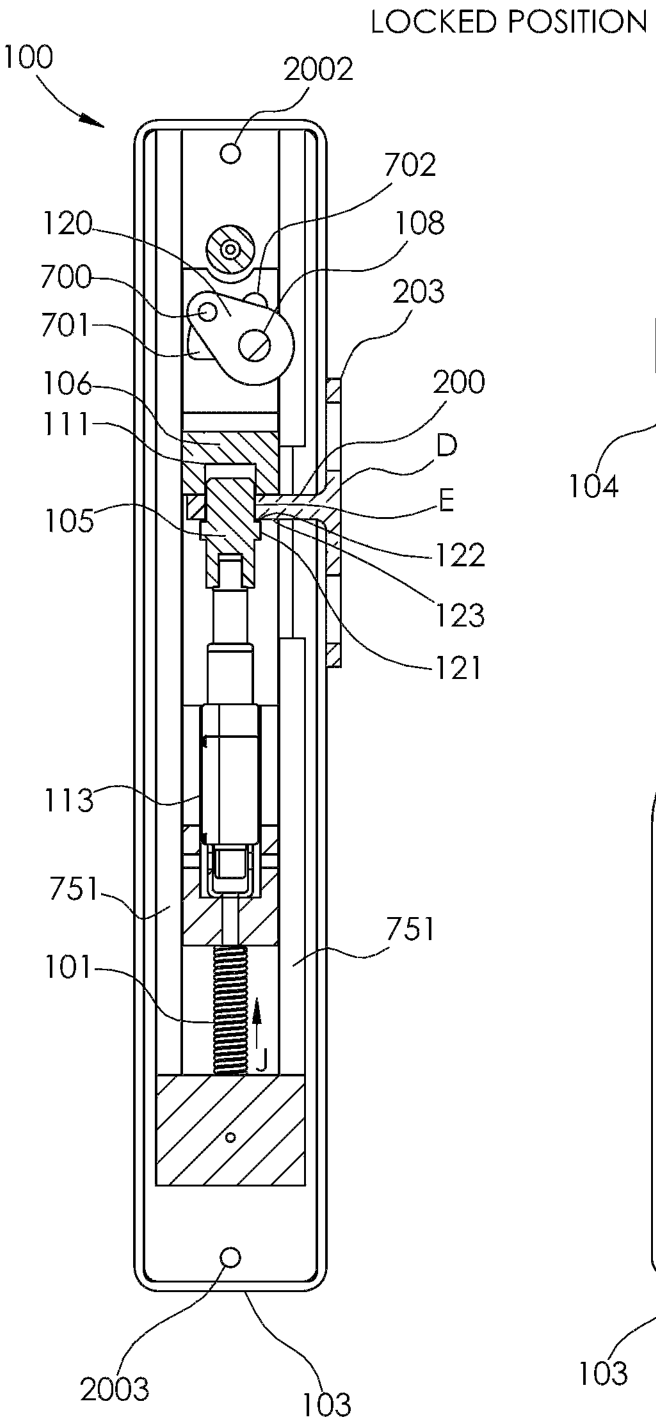
FIG. 6B depicts a cross section view of an embodiment of a door securing apparatus of the invention in a locked state.
Figure 6A:
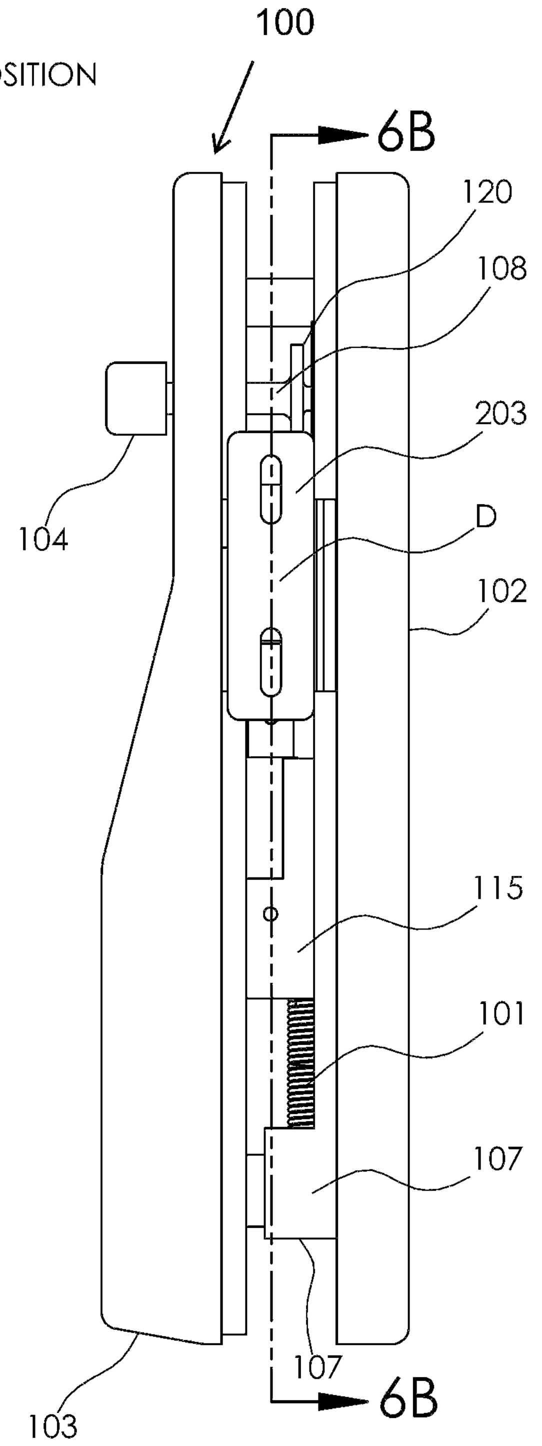
FIG. 6A depicts a side view of an embodiment of a door securing apparatus of the invention in a locked state.
Figure 7B:
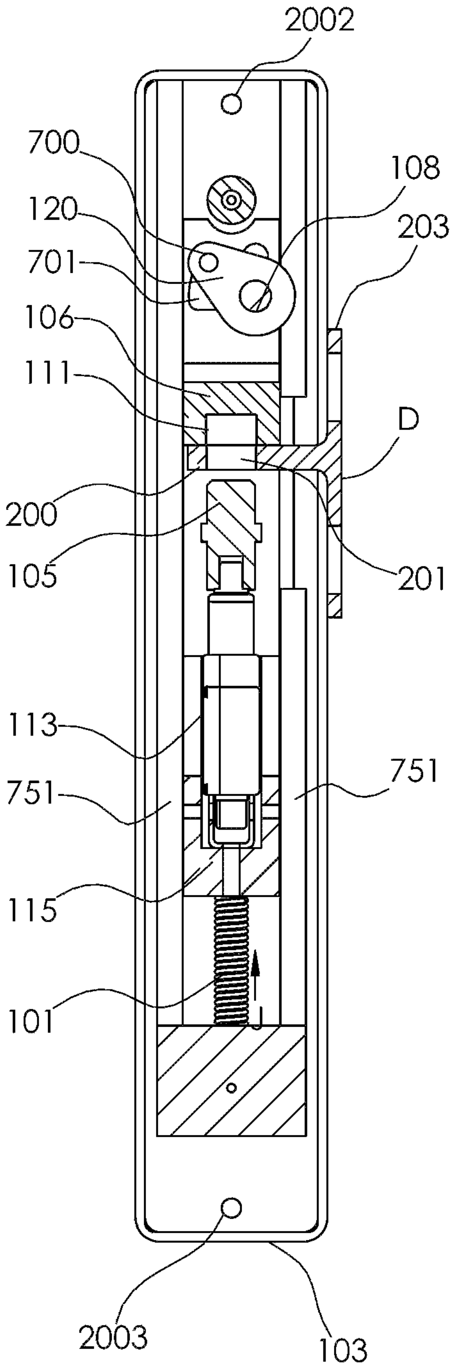
FIG. 7B depicts a cross section view of an embodiment of a door securing apparatus of the invention in an unlocked state.
Figure 7A:
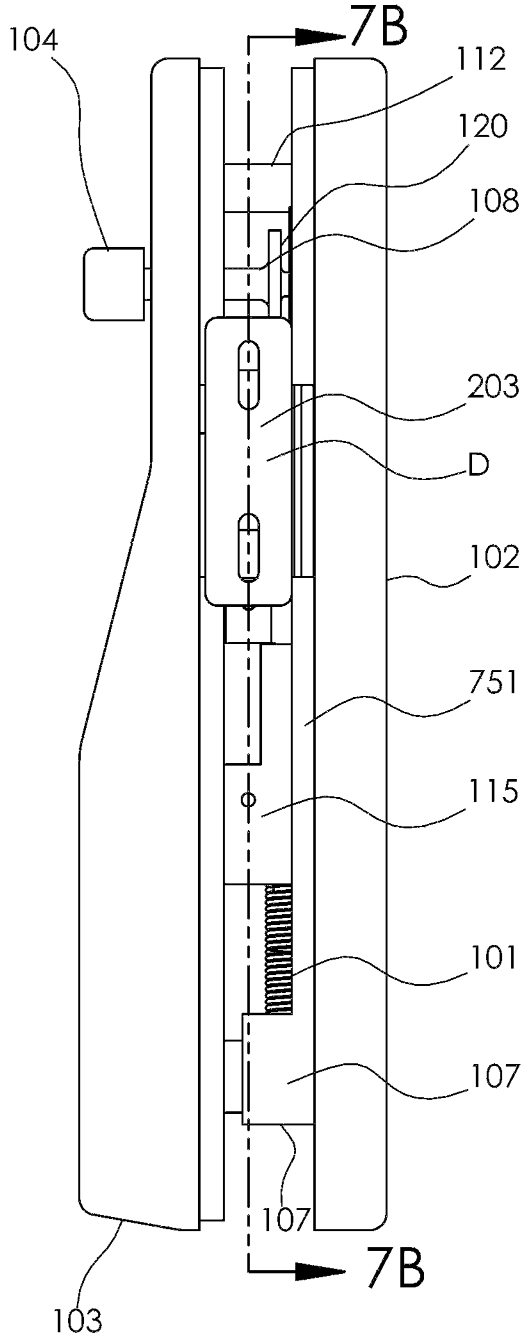
FIG. 7A depicts a side view of an embodiment of a door securing apparatus of the invention in an unlocked state.
Figure 8B:
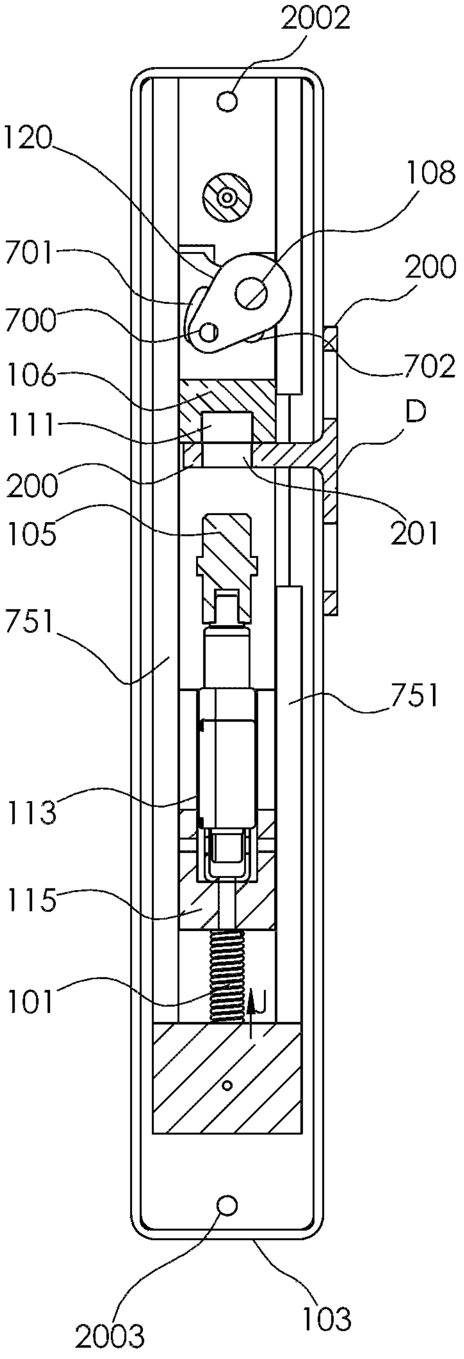
FIG. 8B depicts a cross section view of an embodiment of a door securing apparatus of the invention in an override, or unlocked, state.
Figure 8A:
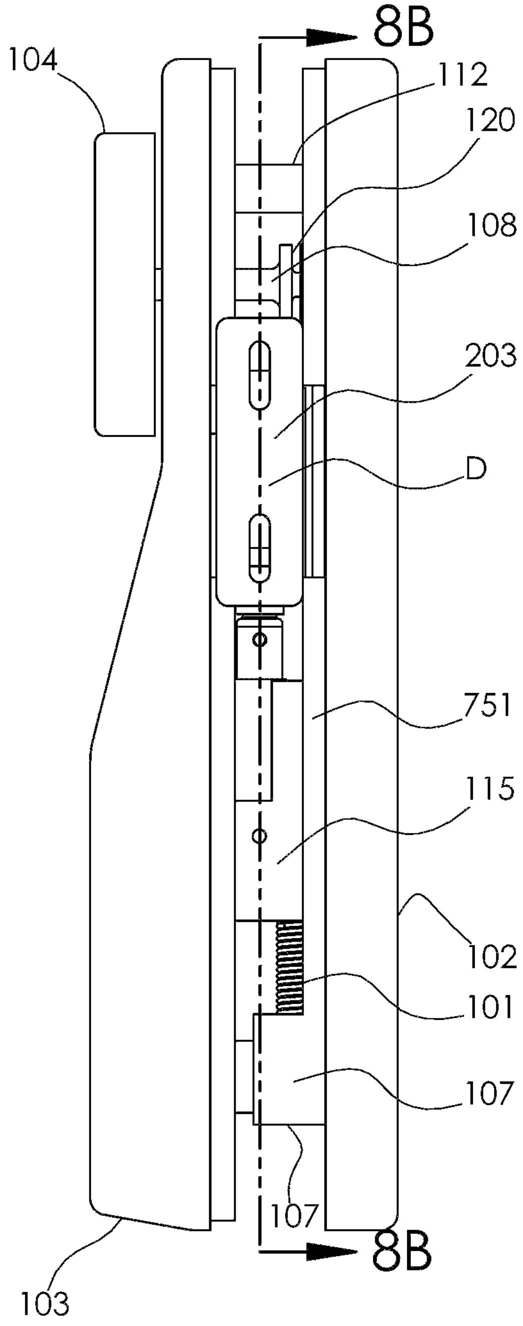
FIG. 8A depicts a side view of an embodiment of a door securing apparatus of the invention in an override, or unlocked, state.
Figure 9B:
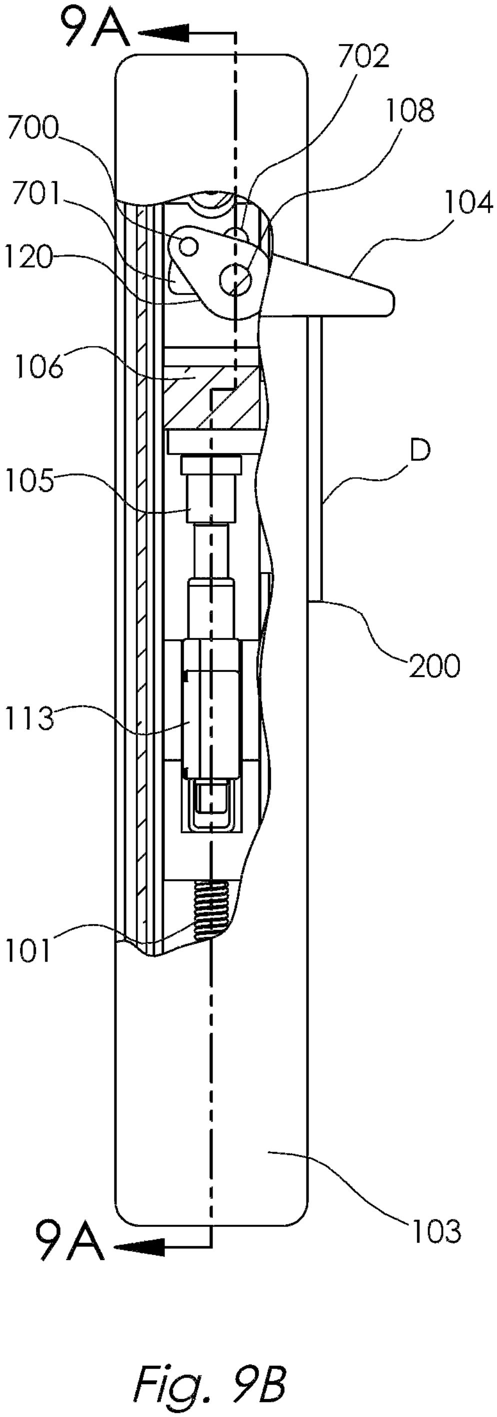
FIG. 9B depicts a front view of an embodiment of a door securing apparatus of the invention in a locked state.
Figure 9A:
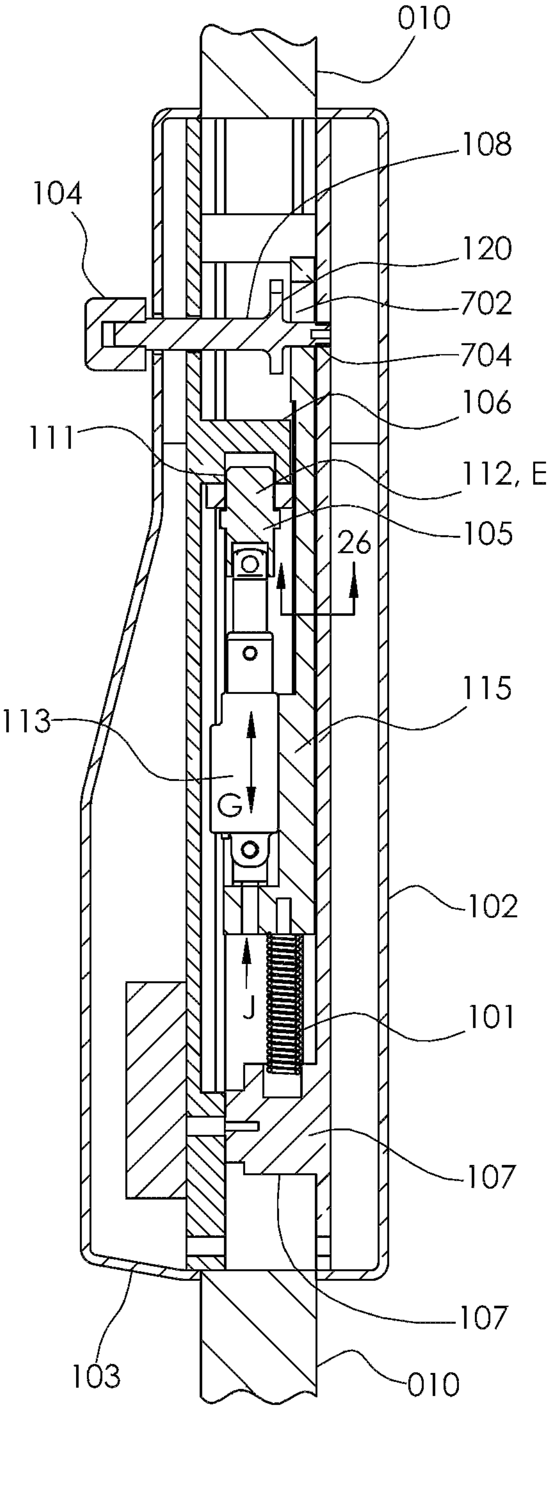
FIG. 9A depicts cross section view of an embodiment of a door securing apparatus of the invention in a locked state.
Figure 10B:
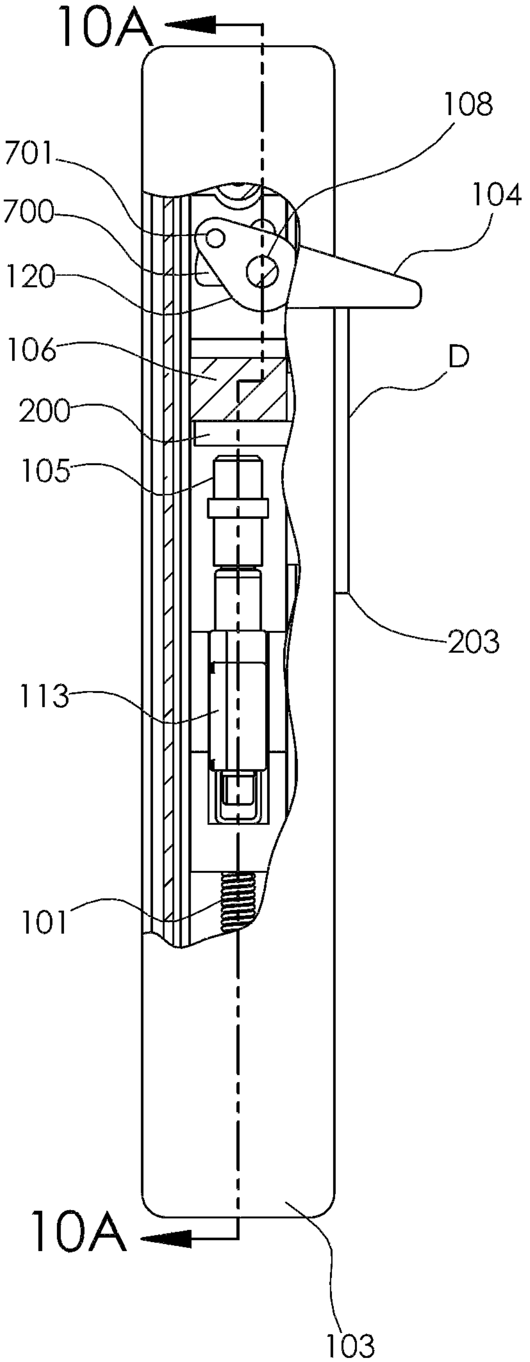
FIG. 10B depicts a front view of an embodiment of a door securing apparatus of the invention in an unlocked state.
Figure 10A:
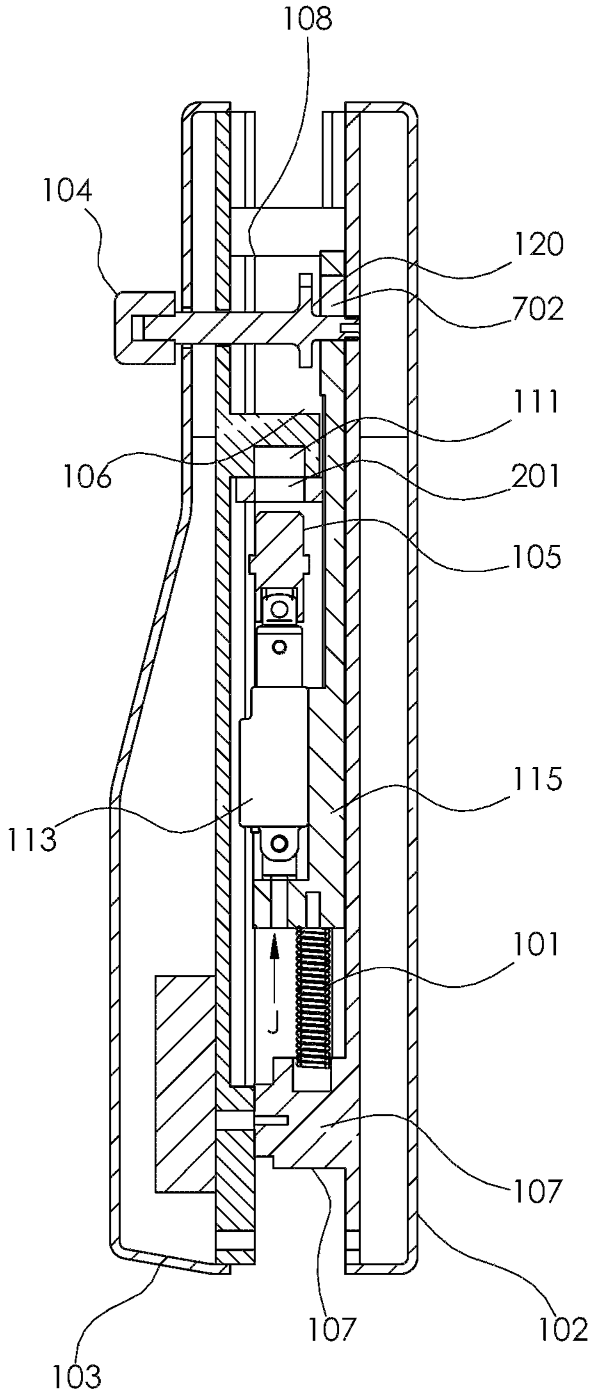
FIG. 10A depicts cross section view of an embodiment of a door securing apparatus of the invention in an unlocked state.
Figure 14:
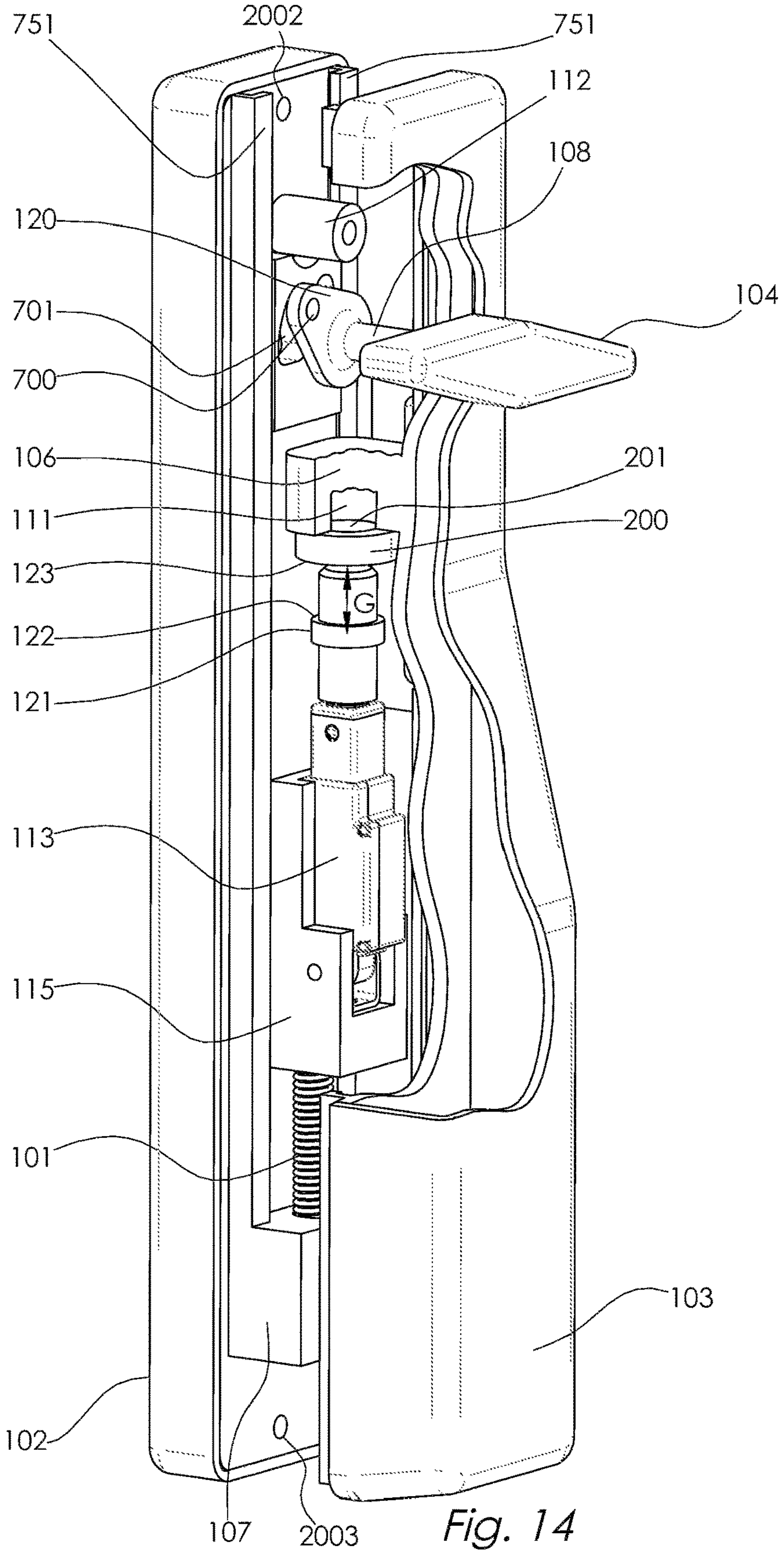
FIG. 14 depicts a front perspective view of an embodiment of a door securing apparatus of the invention in an unlocked state, in which the indoor cover is partially cut away to reveal the components and elements of this exemplary embodiment of the invention.
Figure 15:
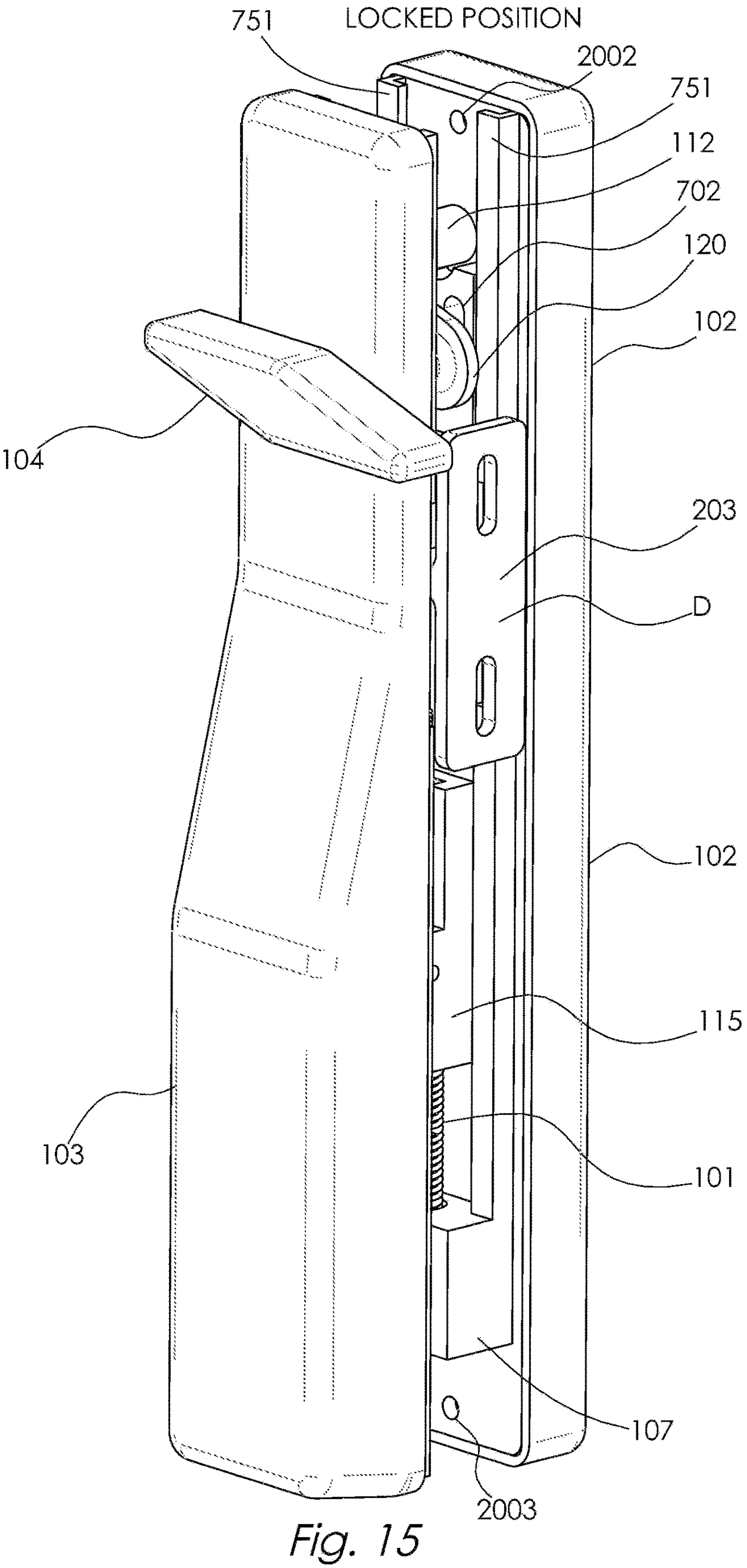
FIG. 15 depicts a front perspective view of an embodiment of a door securing apparatus of the invention.
Figure 16:
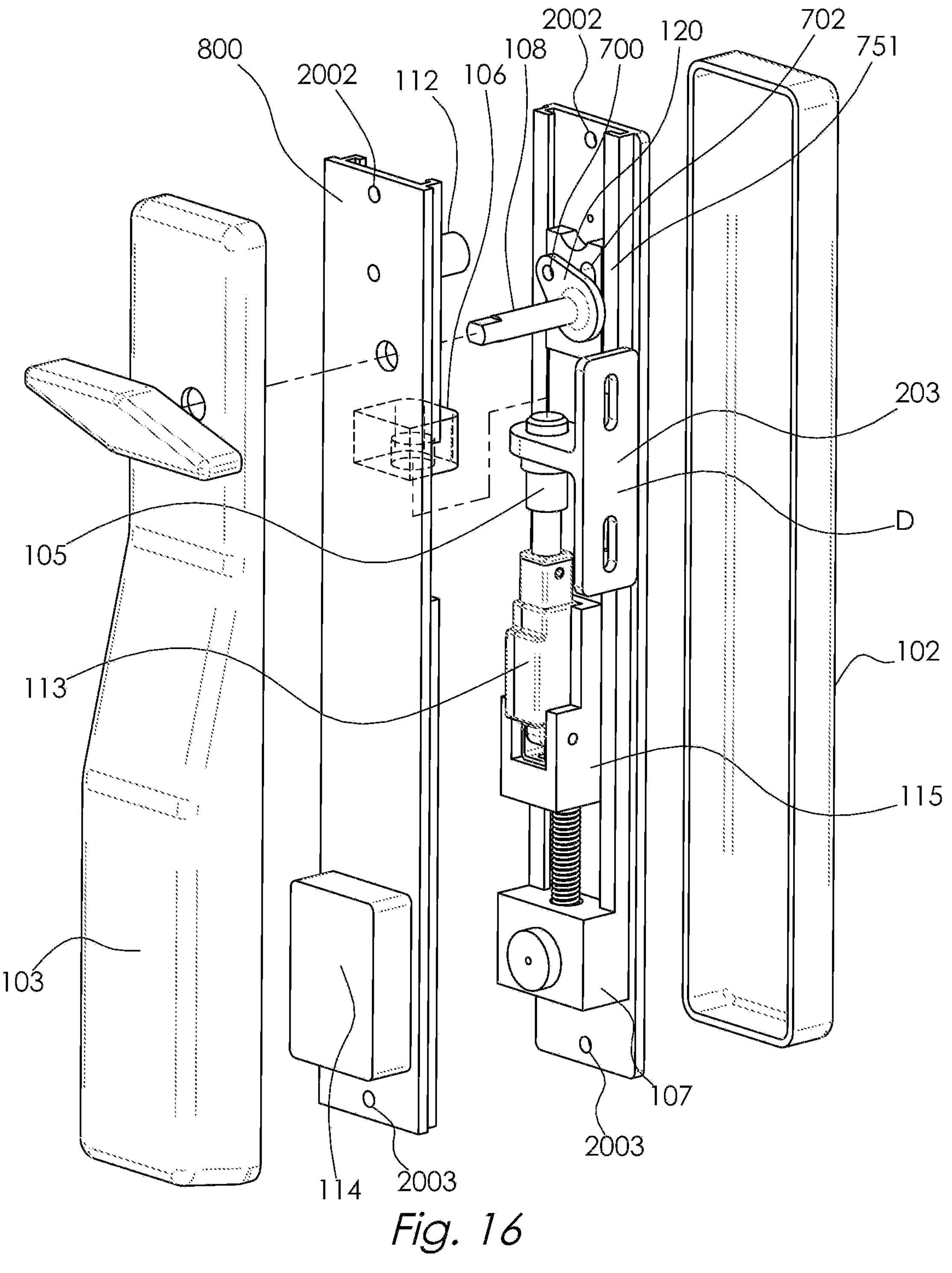
FIG. 16 depicts an exploded view of an embodiment of a door securing apparatus of the invention.
Figure 17:
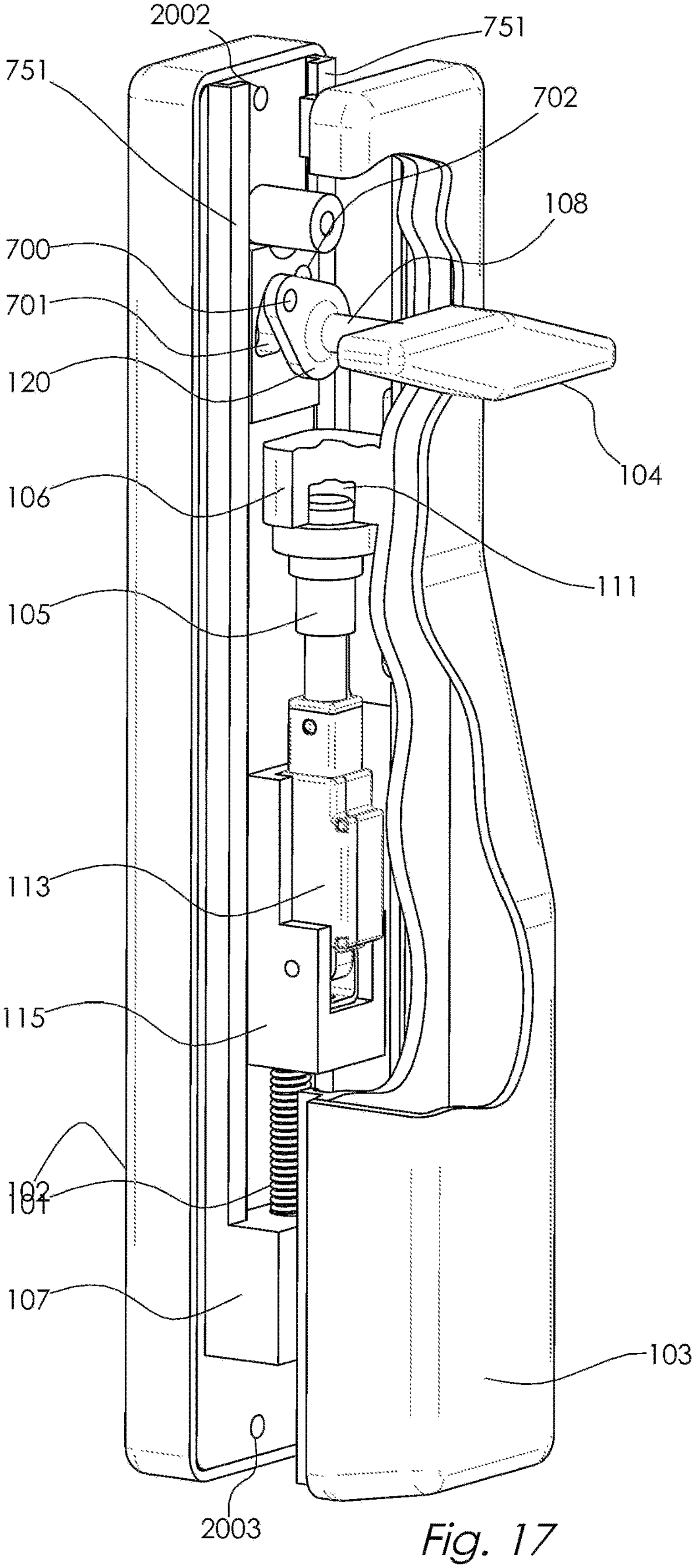
FIG. 17 depicts a front perspective view of an embodiment of a door securing apparatus of the invention in a locked state, in which the indoor cover is partially cut away to reveal the components and elements of this exemplary embodiment of the invention.
Figure 18:
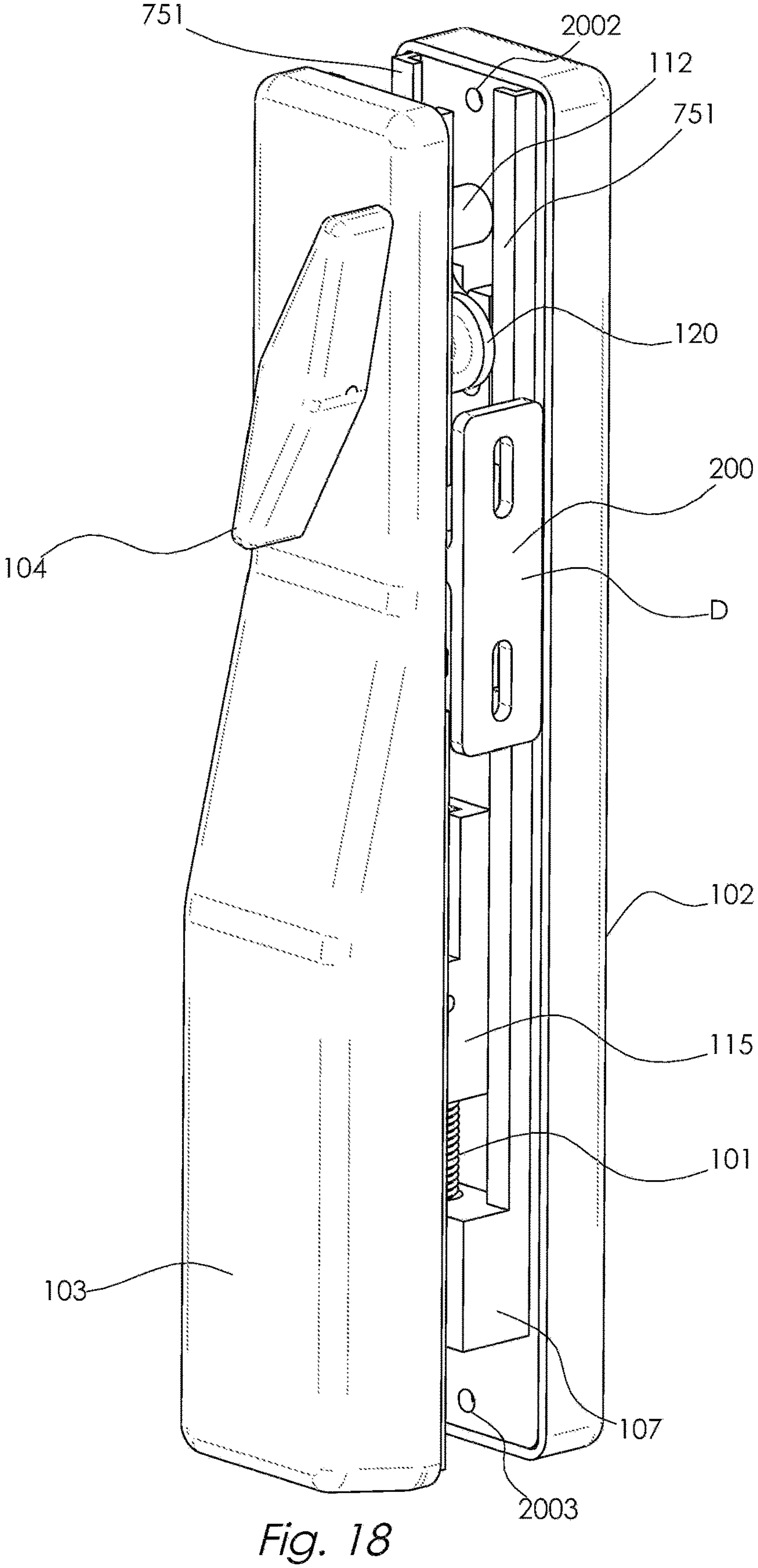
FIG. 18 depicts a front perspective view of an embodiment of a door securing apparatus of the invention.
Figure 19:
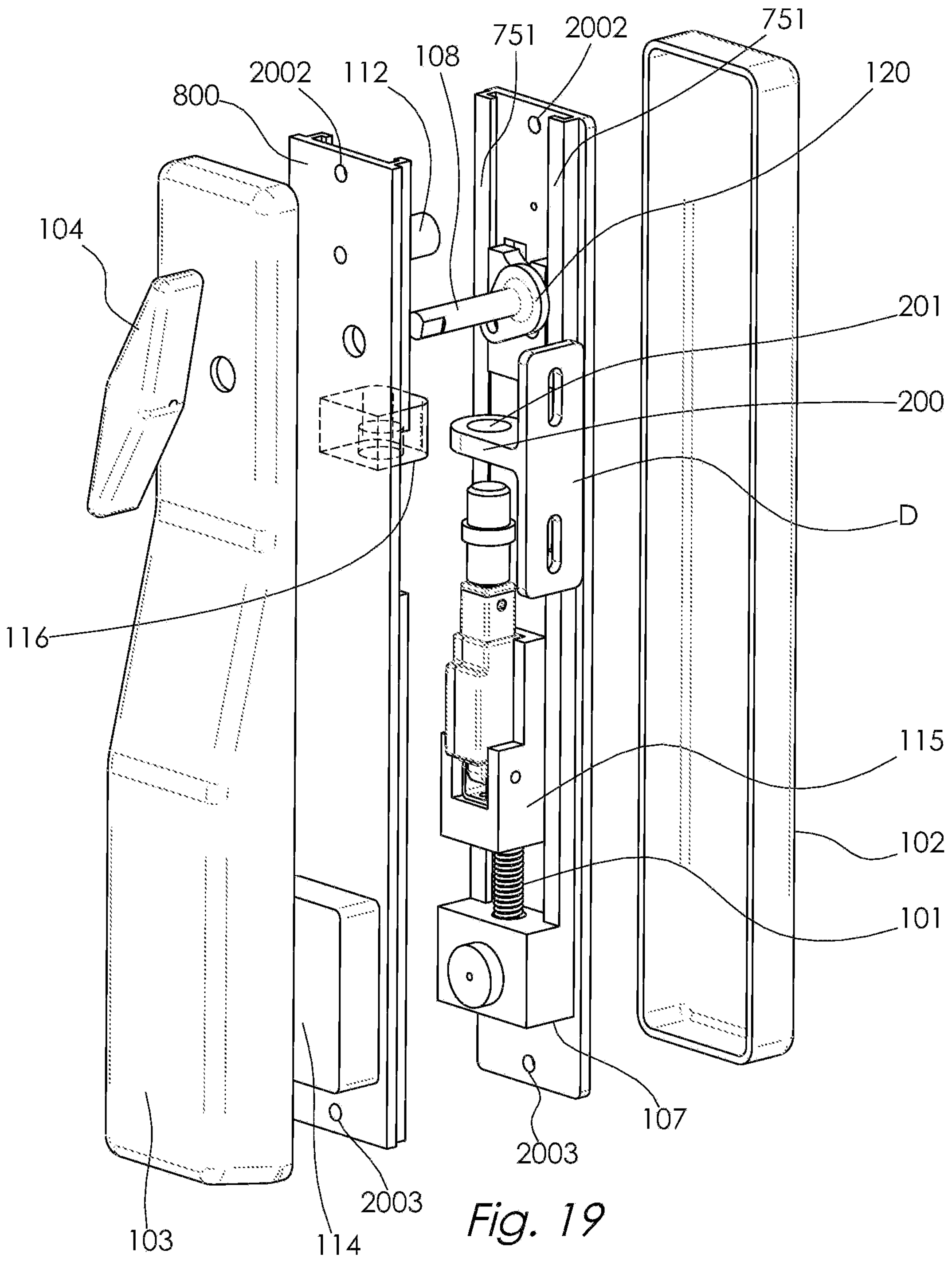
FIG. 19 depicts an exploded view of an embodiment of a door securing apparatus of the invention.
Figure 20:
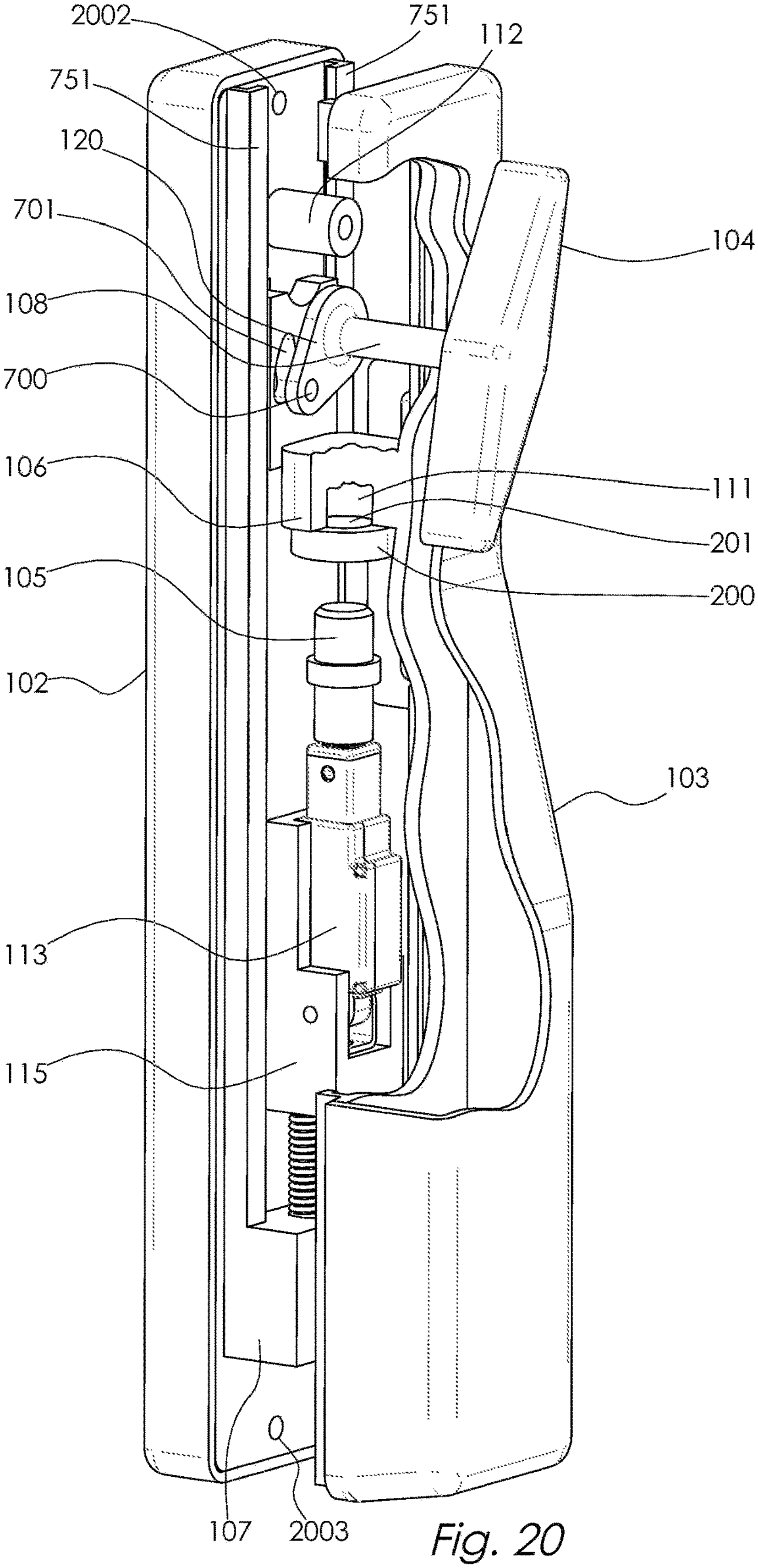
FIG. 20 depicts a front perspective view of an embodiment of a door securing apparatus of the invention in an override, or unlocked state, in which the indoor cover is partially cut away to reveal the components and elements of this exemplary embodiment of the invention.

Referring now to FIGS. 6B and 14, in embodiments, it is a feature and object of the apparatus of the invention that the door or window 003 is prevented from being lifted to the point that it may be removed from the bottom frame portion, or track, 001" and physically removed from frame 001" even though the locking apparatus is in a locked position. This feature of the inventive locking apparatus is a significant advantage over a known weakness of sliding doors and windows of the prior art, especially, but not limited to, sliding doors. In the present invention, shoulder 121 on locking pin 105, having a surface 122 that faces opposing surface 123 of locking tab 200, prevents a door or window 003 from being motivated upwards because shoulder surface 122 comes into contact with, or is located in close proximity to, pin locking tab surface 123, which physically prevents upward translation of door or window 003 in frame 001 to the point that the door or window is able to removed from the bottom track 001". The outside diameter, or outer dimension in the cases in which the cross section of locking pin 105 is not circular, of shoulder 121 is greater than an outer diameter or dimension of pin receiving opening 201 in pin locking tab 200. In non-limiting exemplary embodiments, the gap between shoulder surface 122 and locking tab surface 123 may be in a range of 0.0 to 0.250 inches, or 0.060 to 0.125 inches, or any range within these ranges, or any other range that prevents a door or window 003 from being motivated upwards to the point that the door or window is able to be removed from the bottom track 001".

Figure 12:
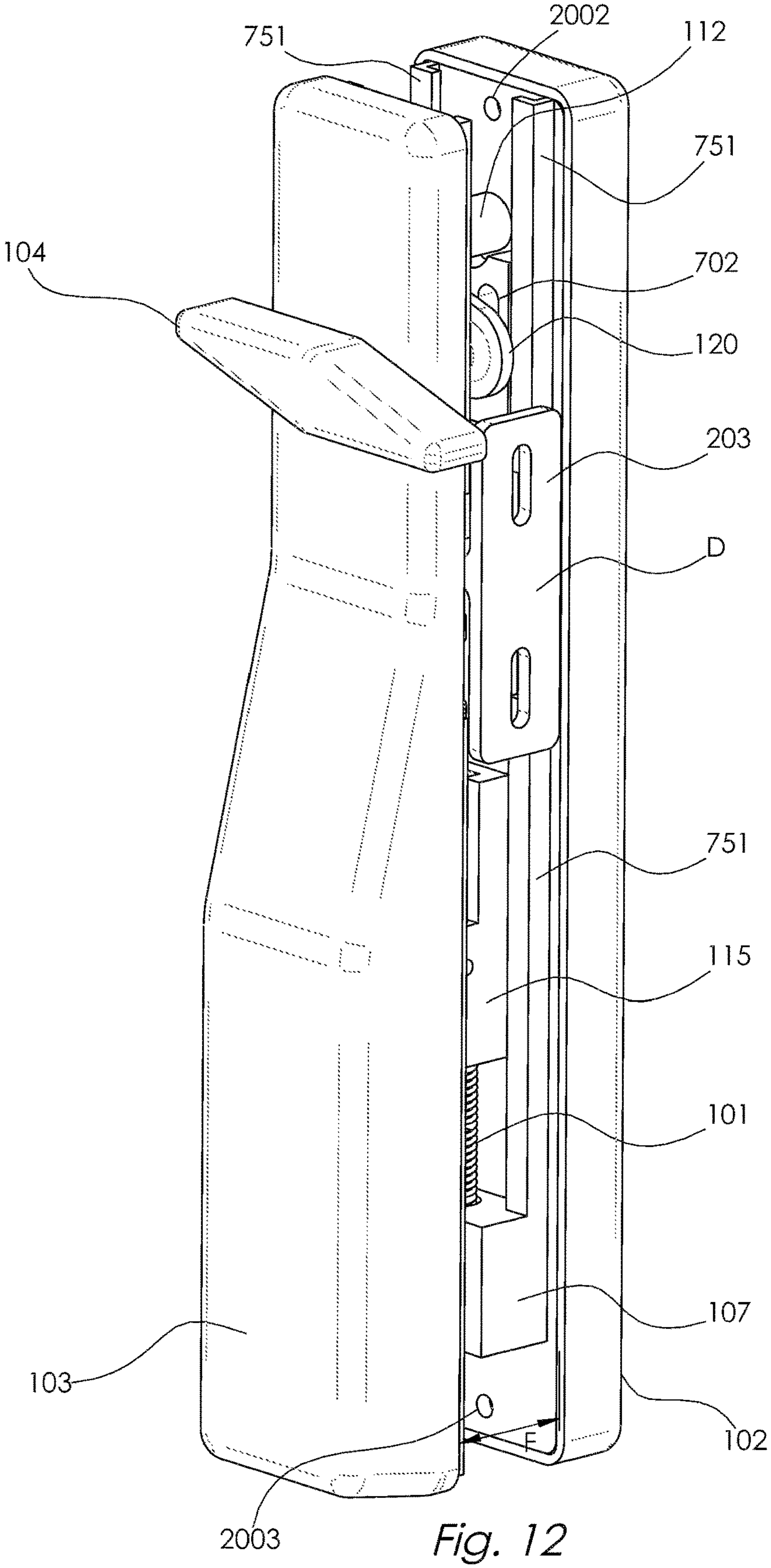
FIG. 12 depicts a front perspective view of an embodiment of a door securing apparatus of the invention.
Figure 13:
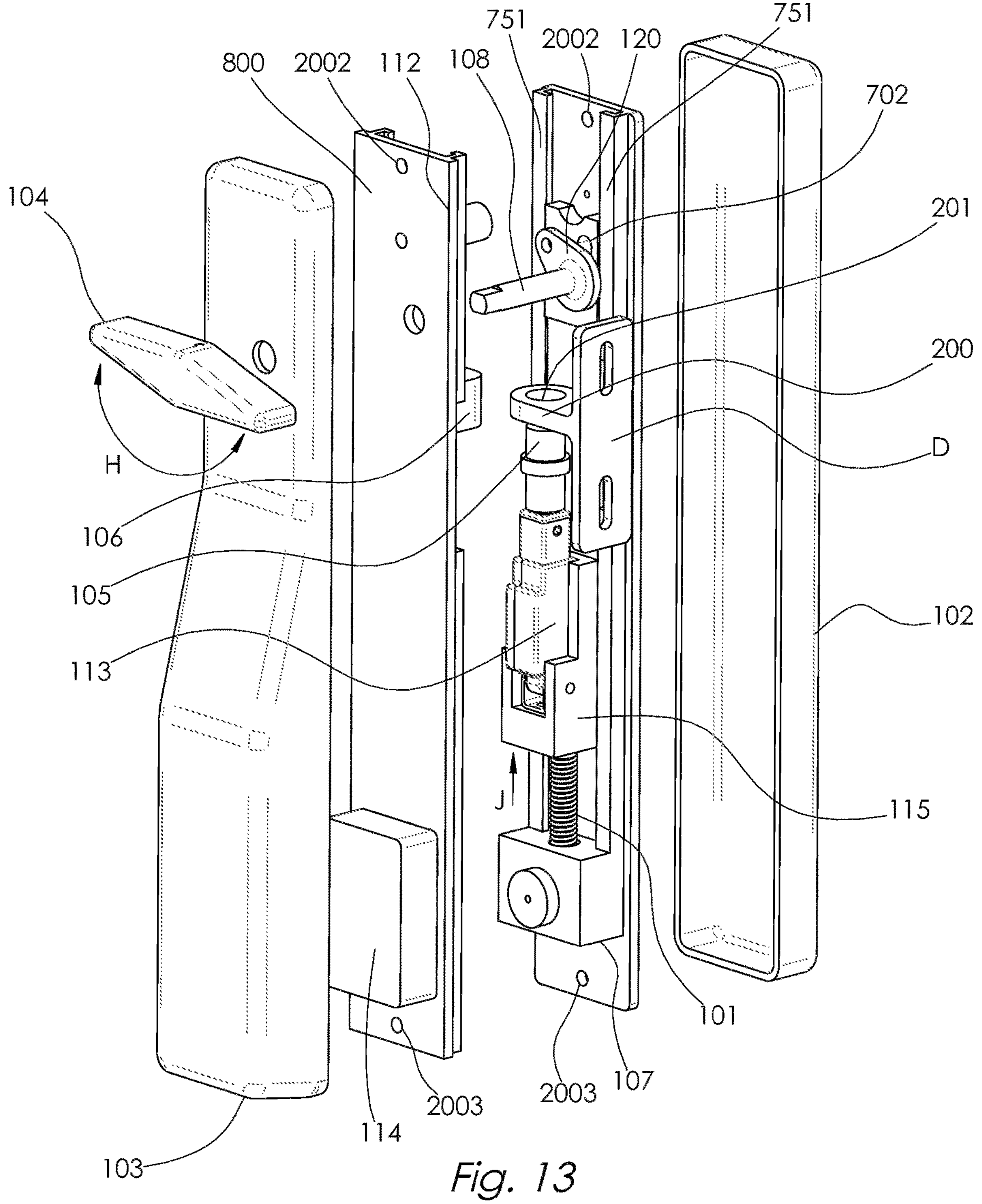
FIG. 13 depicts an exploded view of an embodiment of a door securing apparatus of the invention.

Referring now to FIG. 12, dimension F may be determined by a thickness of the door or window 003 portion to which the locking apparatus first portion is mounted, or attached. For example, in the exemplary case depicted in FIG. 5A, dimension F may be determined by a thickness of window or door frame 010.

In embodiments, locking pin 105 may be in a sliding engagement with pin receiving opening 201 in pin locking tab 200 when the locking apparatus is in the locked state. Further, the distal end of locking pin 105 may comprise a leading-edge chamfer to assist in engaging locking pin with pin receiving opening 201 or locking pin receiving recess 111. In embodiments, pin receiving opening 201 may, on its surfaces that are in a sliding engagement with locking pin 105, comprise a friction reducing sleeve or material comprising a known friction reducing material such as, but not limited to, Teflon® or Delrin®. Alternatively, pin receiving opening 201 may comprise any lubricating material or substance.

While locking pin 105 and pin receiving opening 201 for receiving controllable locking pin 105 are depicted in the drawings as having a circular cross section, it is to be understood that the scope of the invention is intended to include all cross sections such square, oval, rectangular or any other cross section. The exemplary circular cross section is depicted and described herein as but one of many embodiments.

Figure 23:
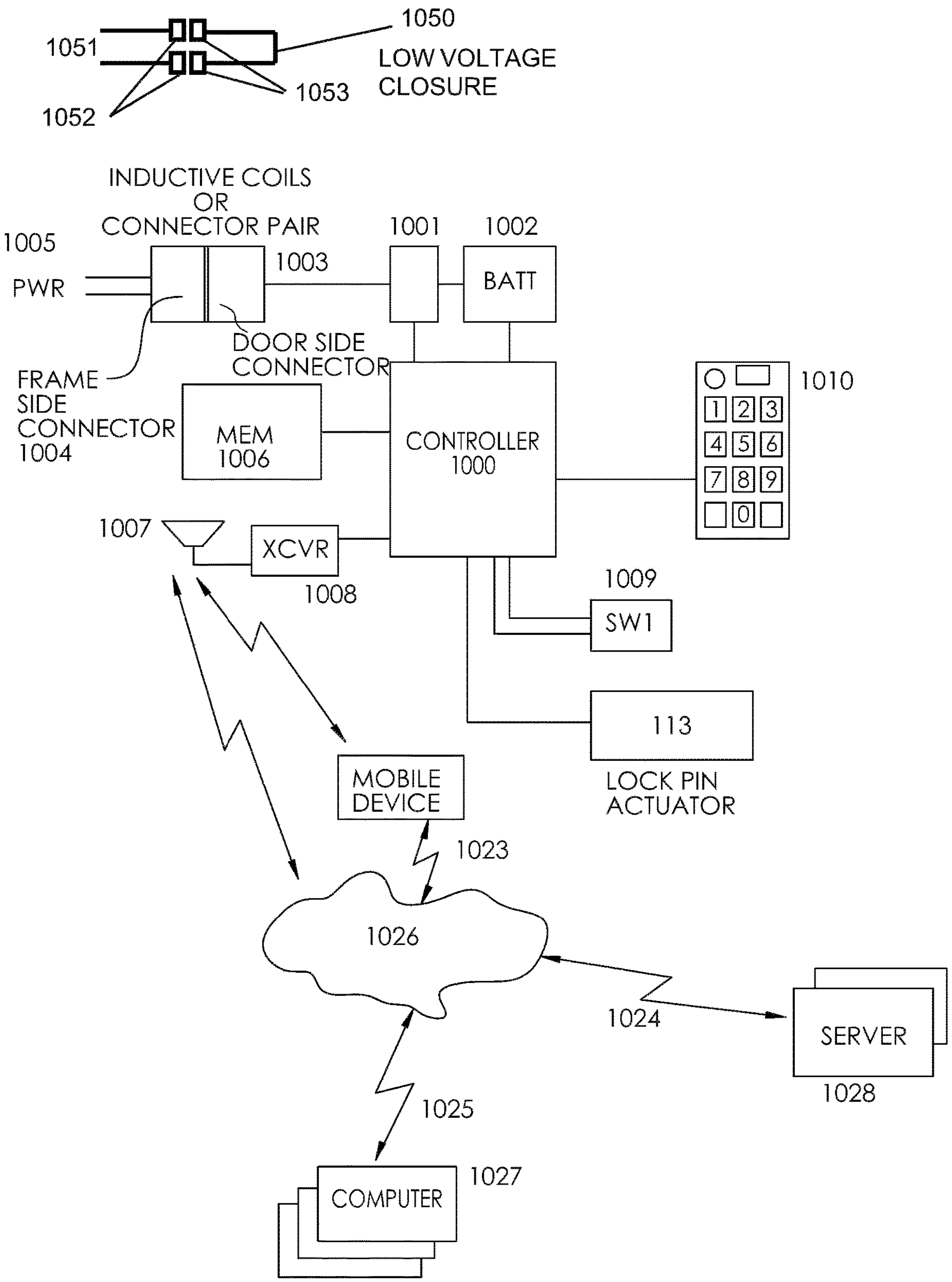
FIG. 23 depicts an exemplary electrical block diagram of an embodiment of the invention.

Referring now to FIG. 23, an electrical block diagram of an exemplary embodiment of the invention is described. Except as otherwise described herein, any of the various electrical or electronic components comprising the invention may be located within the door lock apparatus cover 103, and, in embodiments, may be located within an enclosure 114 that is enclosed within indoor cover 103 or outside cover 102. The various electrical and electronic elements comprising the electrical block diagram may be physically interconnected via electrically conductive wiring and connectors, or via printed wiring boards which may be rigid or flexible, or any other means for electrically connecting electrical and electronic components as may be known in the art.

Still referring to FIG. 23, in embodiments, the various functions of the invention may be carried out by controller 1000 executing non-transitory computer readable and executable instructions that may be stored in a physical storage media 1006, which may be, for example, a physical media such as a semiconductor memory, or any other physical media capable of storing such information, that is in communication with controller 1000. Controller 1000 may also be in communication with a user input device 1010 which may be a keypad, keyboard, touchscreen, audio interface with associated speech recognition computer readable and executable instructions for converting audible speech commands to computer executable commands residing in physical storage media 1006, discrete electrical switches or pushbuttons, or other user input elements and devices that are known in the electrical and computer arts. User input device 1010 may be physically located on an exterior-facing, or outdoor, surface of outside cover 102 such that a user may access and input commands, codes, and data into user input device 1010 from outside the building, in other words in the exterior, outside or outdoor environment. Thus, for example, when the door locking apparatus of the invention is in a locked state, a user may approach a building and enter a code into user input device 1010; speak a voice command into user input device 1010 that is converted to executable instructions for operating and commanding controller 1000; engage or operate one or more discrete switches (in other words, change the state of one or more discrete switches from open to closed or vice versa); or by inputting codes or commands into user input device 1010 in any manner as may be known in the electrical arts, such that controller 1000 receives such commands and is able to execute such commands to carry out the various functions of the invention as described herein.

Still referring to FIG. 23, in embodiments, controller 1000 may be in electrical communication with a battery or other source of electric power 1002. Battery or other source of electrical power 1002 may be, but is not necessarily, located on locking apparatus first portion 100, for example within enclosure 114 (see FIG. 13) or may be located exterior to locking apparatus first portion 100. In the embodiments in which battery or other source of electric power 1002 is located on the locking apparatus first portion 100, an electrical connection may be made with a source of electrical energy 1005 that is operable to charge battery 1002, such as house current (for example 115 Volts alternating current, or VAC) or a direct current (DC) voltage. In embodiments, the electrical connection between battery 1002 and a source of electrical charging or powering current may be through a power conditioning circuit 1001 that conditions, or controls, voltage and current to appropriate levels for charging battery 1002 or powering the electrical components of the invention. In order to establish the electrical connection between battery 1002 and a source of electrical charging or powering current, mating connector portions 1003 and 1004 may be physically located such that they mate together and come into electrical contact with one another when a door or window 003 is placed into a closed state, so that source of electrical power 1005 is placed into electrical communication with power conditioning circuit 1001, battery 1002, or directly with the electrical components of the invention. As an example, connector half 1003 may be physically located on a surface of a door or window 003 such as for example, on a frame 010 of door or window 003, and connector half 1004 may be physically located on a surface of a receiving structure that receives the door or window 003 when the door or window is placed into a closed state, such as when it is received by a frame 001. In this manner, connector portions 1003 and 1004 may be physically located such that they mate together and come into electrical contact with one another when a door or window 003 is placed into a closed state, so that an electrical connection is established between and through connectors 1003 and 1004.

Still referring to FIG. 23, in embodiments, battery 1002 may be charged by electromagnetic wireless charging, in which case item 1004 of FIG. 23 may represent a generating induction coil that creates a changing, or alternating, electromagnetic field that is in communication with an external source of electric power. In such embodiments, item 1003 of FIG. 23 may represent a receiving induction coil placed in proximity to the generating induction coil when the door or window 003 is in a closed state, and within the alternating electromagnetic field, such that a resulting induced electric current is generated in the receiving induction coil by the alternating electromagnetic field acting on the receiving induction coil. The resulting electric current may then be communicated to battery 1002 for charging battery 1002. In embodiments, the electromagnetic wireless charging of the invention may comprise resonant inductive coupling for greater charging efficiency. In embodiments that comprise this electromagnetic wireless charging feature, there may not be any wired electrical communication between the locking apparatus first portion 100 and any external electrical circuitry, and, in such embodiments, both battery charging and the data communication for operation of the features and functions of the invention as described and shown may be performed wirelessly.

Still referring to FIG. 23, in embodiments, controller 1000 may be in communication with a transceiver such as a radio frequency ("RF") transceiver 1008 and antenna 1007. Transceiver 1008 may be in communication with controller 1000 and with antenna or other coupling device 1007 for communicating wirelessly with other transceivers that may be connected to a data network 1026 which may be, for example, the Internet, the World Wide Web, a wireless data network such as, for example, cellular, WiFi® or any other wireless data network, a wired data network, or any other data network via one or more wired or wireless connections 1025 and 1024 such that one or more remote computers and other electronic devices 1027, or one or more remote servers 1028, respectively, may be in data communication with controller 1000. In this manner, a remote user may utilize one or more remote computers or other electronic devices 1025 or 1023 to control the functions of the system or to receive and display information about the status or state of a door or window 003 secured by the locking apparatus of the invention to a user as described further herein. Controller 1000 may also be in communication with one or more mobile devices 1023 directly. Such devices 1023 may also be in communication with computers or electronic devices 1027 and servers 1028 via network 1026. All of the interconnected devices, including controller 1000, may be IP addressable and accessible via the Internet, world wide web, or any data communication network.

Still referring to FIG. 23, in embodiments, controller 1000 may be in electrical communication with an electrical switch 1009 having two states, one state to indicate that the door or window is open, and one state to indicate that the door or window is closed. Switch 1009 may be, for example, a spring-loaded button, magnetic or other style switch, that may be located on a door or window 003 so as be physically contacted and operated upon by a surface of a receiving structure such as frame 001 when door or window 003 is in a closed state, such that when the door or window 003 is transitioned to a closed state from an open state, the switch state is changed from closed to open, or vice versa. In this manner controller 1000 is operable to detect the closed or open state of door or window 003 from switch 1009, indicating to controller 1000 that the door or window 003 is either in a closed or an open state.

Still referring to FIG. 23, in embodiments, controller 1000 may be in electrical communication with controllable actuator 113, which may be a controllable solenoid, controllable actuator, or other controllable device that is operable to extend or retract an extendable portion of actuator 113 upon command by controller 1000 for placing the locking apparatus of the invention into a locked or unlocked state.

Still referring to FIG. 23, in embodiments, an optional electrical contact feature may be included in the locking apparatus of the invention in which an electrical conductor 1050 provides a closed electrical contact across electrical conductors 1051 when door or window 003 is in a closed state such that electrical contacts 1053 contact their mating contacts 1052 as shown in FIG. 23. Electrical wiring 1051, which may be, in embodiments, low voltage wiring, may pass the receiving structure so as to connect to security or other wiring that may be, for example, embedded in or on wall 004. In embodiments that comprise this optional electrical contact feature, electrical contact pairs 1052 and 1053 come into electrical contact when door or window 003 is motivated into a closed state, causing an electrical closure across wire pair 1051. This optional electrical contact feature may be useful for interfacing with wired security systems, which may be low voltage systems, that provide electrical contact pair 1052 for determining whether door or window 003 is in a closed state.

Still referring to FIG. 23, in embodiments, the apparatus may also provide an optional interface to a wired low-voltage security system for providing "door/window closed" or "door/window open" status, in a number of ways. As an example, the apparatus may provide an electrically conductive closure 1050 that operates to close a low-voltage electrical circuit 1051 when frame-side contacts 1052 come into contact with door or window-side contacts 1053 when the door or window is in closed state. In alternate embodiments, circuit closure 1050 may be provided by a door/window-side magnet that is operative to close (or open, as the case may be) an electrical circuit in a magnetic switch located in the door or window frame that is in communication with low-voltage electrical circuit 1051. Still further, in embodiments, the closed or open state of the door or window may be indicated by closing (or opening, as the case may be) an electrical switch that is operative to be electrically closed when the door or window is in a closed state and electrically open when the door or window is in an open state. Such a switch may be physically located and oriented such that closing pressure from a surface of the door or window operates the switch to be closed when the door is in a closed state and open when the door is in an open state, or vice versa. Such a switch may be, for example, a spring-loaded switch that is closed when a spring-loaded plunger is depressed when the door or window is closed, and open when the spring-loaded plunger is released when the door or window is opened, or vice versa. Thus the locking apparatus of the invention may, in embodiments, be operative with existing low-voltage security wiring and may, in embodiments, eliminate the need for other sensors to indicate door or window open or closed status.

In any of the embodiments, locking pin 105 may be, or may form a part of, a solenoid or linear actuator 113, or may be attached to actuator 113 via a threaded engagement, or any other configuration of device(s), that is controllable by controller 1000 for extending or retracting controllable locking pin 105 relative to actuator 113 in the directions depicted by arrow G, as shown, for example, in FIG. 14. Actuator 113 may be in electrical communication with controller 1000 by wired or wireless means such that controller 1000 may command actuator 113 to extend or retract controllable locking pin 105 in the directions depicted by arrow G, as shown, for example, in FIG. 14, thus placing or door or window 003 in a locked or unlocked position upon command by controller 1000.

The various use modes and functions of the embodiments of the invention are now described.

In operation, controller 1000 is able to determine whether door or window 003 is in an open state or a closed state at least by operation of switch 1009 as described above; and, further, controller 1000 is able to determine whether the locking apparatus is in a locked or unlocked state. Controller 1000 is able to determine whether locking pin 105 has been extended such that locking pin 105 has been received by pin receiving opening 201 in pin locking tab 200; or is retracted such that locking pin 105 has not been received by pin receiving opening 201 in pin locking tab 200, and thus whether the locking apparatus is in a locked or unlocked state, respectively, by at least two methods. First, controller 1000 may store in physical storage media 1006, or in an internal non-volatile register in the controller itself, or in any other available storage media, the last state to which controller 1000 commanded actuator 113. Further, in embodiments, actuator 113 may comprise or be in communication with additional contact or magnetic switches that are in communication with controller 1000, the additional contact or magnetic switches having a closed state and an open state, the switches being physically located on or in the locking apparatus so as to change state from open to closed, or vice versa, when controllable actuator 113 is extended, and also when controllable actuator 113 is retracted. Controller 1000 may execute computer readable and executable instructions to read the state of the switches to determine whether controllable actuator 113, and thus locking pin 105, is extended or retracted. The locked state is that state in which controllable actuator 113 and locking pin 105 have been extended, such that locking pin 105 has been received by and engaged at least with pin receiving opening 201 in pin locking tab 200. The unlocked state is that state in which controllable actuator 113 and locking pin 105 has been retracted; i.e., not extended, such that locking pin 105 has been retracted from and is not engaged with pin receiving opening 201 in pin locking tab 200. Still further, it is understood that door or window 003 itself may be in a locked state if: 1) the locking apparatus is in a locked state, and 2) door or window 003 is in a closed state. Thus controller 1000 may determine whether door or window 003 is in a locked or unlocked state by: 1) determining whether locking pin 105 has been extended, and 2) determining from the signal provided by switch 1009 whether door or window 003 is in a closed state. If locking pin 105 is in an extended state and the door or window is in a closed state, controller 1000 may report the door or window 003 as closed and locked, or simply as locked. If the signal from switch 1009 indicates that the door is closed, but the controller 1000 determines that locking pin 105 is in a retracted state, controller 1000 may report that the door is closed and unlocked. If the signal from switch 1009 indicates that the door is open, then by definition it is also unlocked, and controller 1000 may report door or window 003 as being open and unlocked, or simply as open.

Controller 1000 may be in data communication with one or more remote computers or electronic devices 1025, mobile devices 1023 or remote servers 1028, or both, which may be operable to read the closed, open, locked or unlocked status of door or window 003 as determined by controller 1000 and to display these states on a visual display of the electronic devices 1025, mobile devices 1023 or remote servers 1028, or may be able to command controller 1000 to command, by entering data into one or more electronic devices 1025, mobile devices 1023 or remote servers 1028 via input devices such as keypads, touchscreens or keyboards, locking pin 105 to retract (placing the door or window 003 in an unlocked state) or to extend (placing the door or window 003 in a locked state if closed) as desired by user. The one or more remote computers or electronic devices 1025, mobile devices 1023 or remote servers 1028 may comprise controllers or processors for carrying out computer executable instructions that are stored in memory for the purposes of carrying out the functions of the invention; or, in embodiments, a user may use such electronic devices 1025 or mobile devices 1023 to access a web-based, web-accessible portal that is implemented in non-transitory computer readable and executable instructions running on (i.e. executed by) one or more server computers 1028 wherein the web-accessible portal is able to cause the closed, open, locked or unlocked status or state of door or window 003, or any other state or status of the locking apparatus or of door or window 003, to be displayed on a server 1028 visual display or on an electronic device 1025 or a mobile device 1023 display, and may also be able to accept, receive and execute instructions input by a user of a mobile device or computer 1025 or servers 1028 accessing the web accessible portal for the purpose of communicating such commands to controller 1000 and commanding controller 1000 to command locking pin 105 to retract (placing the door or window 003 in an unlocked state), to extend (placing the door or window 003 in a locked state), or to perform any other function or feature of the invention as desired by user using the web accessible portal. In embodiments, the web accessible portal may provide the ability for a user to set times and dates to lock, or unlock door or window 003, to report open, closed, locked or unlocked status of door or window 003, to notify a user of unusual circumstances such as a certain number of openings or closings within a specified time frame, and so on.

User input device 1010, which may be a keypad, touchscreen, plurality of discrete switches, or other user input device, may be located on outdoor cover 102 so as to be accessible from the exterior, or outdoor, side of the building. In the case in which a user wishes to open a door or window 003 that has been secured by the apparatus of the invention, the user may, from outside the building, enter a code comprising one or more digits, numbers, letters or other characters by depressing pins, buttons, switches or by touching such digits, numbers, letters or other characters on user input device 1010. Alternatively, user input device 1010 may comprise one or more discrete switches, or may be a keyboard, or may be a camera for face recognition of a user or a microphone for voice recognition or entry of voice commands. User input device 1010 may be in data communication with controller 1000. If the code, face recognition, voice recognition, or voice commands as received by controller 1000 from user input device 1010 match a predetermined code, face recognition, voice recognition, or voice command(s), controller 1000 may recognize the user as an authorized user, and may then command controllable locking pin 105 to retract, placing the door or window in an unlocked state, allowing the user to enter the building. In embodiments, controller 1000 may command locking pin 105 to be extended to a locked position after a specified period of time after the door has been closed. This is an auto-lock feature that secures the door or window 003 automatically after an authorized user has entered the building.

Referring now to FIG. 24, the locking apparatus may comprise an optional door lift preventer 600 that may be attached to upper window or door frame 010' such that a small gap Y is created between an upper surface of door lift preventer 600 and a surface of upper door frame 001'. This device operates to prevent the lifting of sliding door or window 003 in the direction Z such that it may be removed from its lower track 001" (depicted in FIG. 1). Optional door lift preventer 600 thus may be used to further prevent lifting of the door out of its track, and thus provides additional security to prevent an unauthorized use from gaining access to a building or other structure. In embodiments, optional door lift preventer 600 may be placed near the opposite end of the window or door to be secured 003 from the end of the door or window at which the first and second portion of the locking apparatus are located.

Referring now to FIG. 27, embodiments of the invention may comprise optional manually operable key lock 900 that is attached to knob shaft 108. In these embodiments of the invention, optional key lock 900 comprise a rotatable portion that is only rotatable by inserting a mating key into a receiving mating slot in the rotatable portion, and then rotating the mating key, which in turn rotates the rotatable portion of key lock 900, which is attached to rotatable knob shaft 108. Thus, when the mating key is inserted into key lock 900 and rotated, rotatable knob shaft 108 is rotated such that is operable to place the locking apparatus in a locked or unlocked state as desired by a user. In embodiments, optional key lock 900 may be attached to outside cover 102 such that it is accessible by a user from the outdoor side of the door or window frame 010. Said another way, in embodiments, a user may manually unlock or lock the locking apparatus from the indoor side of a building or structure by rotating knob 104, thus rotating knob shaft 108; likewise, a user may manually unlock or lock the locking apparatus from the indoor side of a building or structure by inserting a mating key into the receiving mating slot in the rotatable portion of key lock 900, and then rotating the mating key, which in turn rotates the rotatable portion of key lock 900, which is attached to rotatable knob shaft 108, causing rotatable knob shaft 108 to rotate. The resulting rotation of rotatable knob shaft 108 may operate to place the locking apparatus into a locked state, an override state or an unlocked state by motivating slide car 115 along its slidable engagement with base plate 107, and thus motivating locking pin 105 to be received by and engaged with pin receiving opening 201 in pin locking tab 200 (i.e., locked state) or motivating locking pin 105 to be removed from and disengaged from pin receiving opening 201 in pin locking tab 200 (i.e., unlocked or override state) as described elsewhere herein (items 108, 115 and 107 are shown, for example, in FIGS. 6A and 6B). Thus, in the event of a power outage, or in the embodiments that do not operate using electrical power or contain any electrical or electronic components, the locking apparatus of the invention is operable to be manually locked or manually unlocked, or both, from both the indoor and the outdoor side. Items 105, 111, 120 and 106 are depicted for reference in FIG. 27.

In the embodiments, of the invention, any of the described features and functions of the invention may be present in any quantity and in any combination. It is not necessary that each described feature or function be present in every embodiment of the invention. In other words, some of the described features and functions of the invention may not be present in some embodiments of the invention. The optional key lock 900 may be present in any of the embodiments of the locking apparatus.

What is claimed is:

1. A locking apparatus for securing a door or window to a receiving structure, comprising:

said locking apparatus attachable to a door or window, and said locking apparatus comprising:

a locking pin having a distal end, said locking pin attached to a slide car via a locking pin attachment, and wherein said slide car is slidably engaged with a base plate, said base plate for attaching said locking apparatus to said door or window, wherein said slidable car is translatable along said sliding engagement;

wherein, when said locking apparatus is attached to a door or window, said base plate is held in a fixed position relative to said door or window; and wherein, when said door or window is a closed state, said locking apparatus is able to receive a pin locking tab; and wherein said locking pin is able to be motivated towards said pin locking tab such that said locking pin is received by a pin receiving opening, resulting in a locked state; and wherein said locking pin is able to be motivated away from said pin locking tab such that no portion of said locking pin is received by said pin receiving opening, resulting in an unlocked state;

wherein said sliding car and said base plate are subject to an expanding force between them tending to motivate said sliding car along said slidable engagement, said expanding force tending to translate said locking pin distal end towards said pin receiving opening;

wherein said locking pin attachment to said slide car is via a controllable actuator, and wherein said locking pin is attached to an extendable portion of said controllable actuator that is able to be extended or retracted upon command, such that said controllable actuator is operable to motivate said locking pin into said pin receiving opening upon command by extending said extendable portion, placing said locking apparatus into said locked state; and wherein said controllable actuator is operable to motivate said locking pin out of said pin receiving opening upon command by retracting said extendable portion, placing said locking apparatus into said unlocked state;

further comprising a rotatable knob attached to a rotatable shaft, and wherein said rotatable shaft is attached to an override mechanism such that, when said locking apparatus is in said locked state, a rotation of said rotatable knob in a first direction of rotation is operable to motivate said slide car along its slidable engagement with said base plate against said expanding force such that said locking pin is motivated out of said pin receiving opening, placing said locking apparatus in an override state; and wherein when said locking apparatus is in an override state, rotation of said rotatable knob in a second direction of rotation that is opposite said first direction of rotation allows said expanding force to motivate said locking pin into said pin receiving opening, placing said locking apparatus in said locked state.

2. The locking apparatus of claim 1, further comprising a key lock attached to said rotatable shaft, such that, when said locking apparatus is in said locked state, a rotation of a mating key in said key lock in a first direction of rotation is operable to motivate said slide car along its slidable engagement with said base plate against said expanding force such that said locking pin is motivated out of said pin receiving opening, placing said locking apparatus in an override state; and wherein, when said locking apparatus is in an override state, rotation of said mating key in said key lock in a second direction of rotation that is opposite said first direction of rotation allows said expanding force to motivate said locking pin into said pin receiving opening, placing said locking apparatus in said locked state.

3. The locking apparatus of claim 2, wherein said locking apparatus is further defined as having an indoor portion and an outdoor portion, wherein said key lock is accessible on said outdoor portion.

4. The locking apparatus of claim 1, wherein said locking pin comprises a shoulder surface facing an opposing surface of said locking tab when said door is in said closed state, and wherein a gap between said shoulder surface and said opposing surface of said pin locking tab is small enough to prevent the lifting of said door or window out of a bottom track receiving structure, due to interference between said shoulder surface and said opposing surface of said pin locking tab.

5. The locking apparatus of claim 4, wherein said gap is in a range of 0.060-0.125 inches.

6. The locking apparatus of claim 1, wherein said controllable actuator is in communication with a controller, and wherein said controller is adapted to command said locking apparatus into a locked state or an unlocked state by commanding controllable actuator extendable portion to extend or retract.

7. The locking apparatus of claim 6, wherein said controller is in communication with at least one mobile device or computer, wherein said at least one mobile device or computer is adapted to receive user input commands for commanding said locking apparatus into said locked state, and wherein said at least one mobile device or computer is adapted to communicate said user input commands to said controller, and, wherein said controller is adapted to command said locking apparatus into said locked state upon receipt of said user commands from said at least one mobile device or computer.

8. The locking apparatus of claim 6, wherein said controller is in communication with at least one mobile device or computer, wherein said at least one mobile device or computer is adapted to receive user input commands for commanding said locking apparatus into said unlocked state, and wherein said at least one mobile device or computer is adapted to communicate said user input commands to said controller, and, wherein said controller is adapted to command said locking apparatus into said unlocked state upon receipt of said user commands from said at least one mobile device or computer.

9. The locking apparatus of claim 6, wherein said controller is in communication with at least one mobile device or computer, wherein said at least one mobile device or computer is adapted to receive user input commands for commanding said locking apparatus into said locked state at a predetermined time, and wherein said at least one mobile device or computer is adapted to communicate said user input commands to said controller, and, wherein said controller is adapted to command said locking apparatus into said locked state at said predetermined time.

10. The locking apparatus of claim 9, wherein said controller is in communication with at least one mobile device or computer, and wherein said controller is adapted to communicate the state of said locking apparatus to said mobile device and said mobile device is adapted to display the state of said locking apparatus on a visual display of said mobile device or computer.

11. The locking apparatus of claim 9, further comprising a user input device in communication with said controller, said user input device operable to receive a user input code from a user for commanding said controller to command the locking apparatus in said locked or said unlocked state.

12. The locking apparatus of claim 6, wherein said controller is in communication with at least one mobile device or computer, wherein said at least one mobile device or computer is adapted to receive user input commands for commanding said locking apparatus into said unlocked state at a predetermined time, and wherein said at least one mobile device or computer is adapted to communicate said user input commands to said controller, and, wherein said controller is adapted to command said locking apparatus into said unlocked state at said predetermined time.

13. The locking apparatus of claim 6, further comprising at least one server in communication with said controller, wherein said at least one server comprises instructions for presenting a web-accessible portal to a browser application, and wherein said web-accessible portal is in communication with at least one user mobile device or computer via a browser application operating on said at least one user mobile device or computer, and wherein said web portal is adapted to receive user input commands from said at least one user mobile device or computer for commanding said controller to command said locking apparatus into said locked state or said unlocked state, and to transmit such user input commands to said controller, such that said controller commands said locking apparatus into said locked state or said unlocked state.

14. The locking apparatus of claim 6, further comprising at least one server in communication with said controller, wherein said server comprises instructions for presenting a web-accessible portal to a browser application, and wherein said web-accessible portal may be in communication with at least one user mobile device or computer via a browser application operating on said at least one user mobile device or computer, and wherein said web portal is adapted to receive status information of said locking apparatus as being either in a locked state, an unlocked state or an override state from said controller, and to display said status information of said locking apparatus on a display of said at least one user mobile device or computer.

15. The locking apparatus of claim 6, further comprising at least one server in communication with said controller, wherein said server comprises instructions for presenting a web-accessible portal to a browser, and wherein said web-accessible portal may be in communication with at least one, or a plurality of, user mobile devices or computers via a browser application operating on said at least one user mobile device or computer, and wherein said web portal is adapted to receive status information of said door or window as being either in an open state or a closed state from said controller, and to display said status information of said door or window on a display of said at least one user mobile device or computer.

16. The locking apparatus of claim 1, wherein said locking apparatus is further defined as having an indoor portion and an outdoor portion, wherein said rotatable knob is accessible on said indoor portion.

17. The locking apparatus of claim 1, wherein said base plate, said sliding car, and said locking pin comprise an assembly that is disposed within a void located in a window or door frame.

* * * * *